United States Patent
Kim et al.

(10) Patent No.: US 9,571,178 B2
(45) Date of Patent: Feb. 14, 2017

(54) METHOD AND APPARATUS FOR TRANSMITTING AND RECEIVING DATA IN A WIRELESS COMMUNICATION SYSTEM THAT SUPPORTS A RELAY NODE

(75) Inventors: Dongin Kim, Seongnam-si (KR); Wan Choi, Seoul (KR); Sung Sik Nam, Seoul (KR); Hanbyul Seo, Anyang-si (KR)

(73) Assignees: LG ELECTRONICS INC., Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 472 days.

(21) Appl. No.: 14/009,693

(22) PCT Filed: Apr. 19, 2012

(86) PCT No.: PCT/KR2012/003003
§ 371 (c)(1),
(2), (4) Date: Oct. 3, 2013

(87) PCT Pub. No.: WO2012/144822
PCT Pub. Date: Oct. 26, 2012

(65) Prior Publication Data
US 2014/0022982 A1  Jan. 23, 2014

Related U.S. Application Data

(60) Provisional application No. 61/477,150, filed on Apr. 19, 2011.

(51) Int. Cl.
*H04B 7/14* (2006.01)
*H04L 1/18* (2006.01)
(Continued)

(52) U.S. Cl.
CPC ........ *H04B 7/14* (2013.01); *H04B 7/15* (2013.01); *H04L 1/0077* (2013.01);
(Continued)

(58) Field of Classification Search
CPC ......... H04B 7/14; H04B 7/15; H04B 7/15592; H04L 1/0056
See application file for complete search history.

(56) References Cited

U.S. PATENT DOCUMENTS

2008/0144562 A1* 6/2008 Draper ............... H04B 7/026
370/315
2009/0175214 A1* 7/2009 Sfar ................. H04B 7/15592
370/315
(Continued)

FOREIGN PATENT DOCUMENTS

WO  WO 2010056006 A2 * 5/2010 ............. H04B 7/155
WO  WO 2010/074530 A2   7/2010
(Continued)

OTHER PUBLICATIONS

Li, et al., "A Joint Network and Channel Coding Strategy for Wireless Decode-and-Forward Relay Networks," IEEE Transactions on Communications, vol. 59, No. 1, pp. 181-193, Jan. 2011.

*Primary Examiner* — Scott M Sciacca
(74) *Attorney, Agent, or Firm* — Birch, Stewart, Kolasch & Birch, LLP

(57) ABSTRACT

A method and apparatus for transmitting and receiving data in a wireless communication system that supports a relay node are disclosed, wherein an open-loop mode is provided between the relay node and a user equipment. A method for transmitting data from a relay node to a user equipment comprises the steps of receiving information on a first condition related to transmission of the data from a base station; receiving first data including a plurality of sequential codes from the base station; and transmitting second data (Continued)

corresponding a part of the first data to the user equipment in accordance with the first condition if decoding of the first code of the plurality of codes is successfully performed.

7 Claims, 19 Drawing Sheets

(51) Int. Cl.
  *H04B 7/15* (2006.01)
  *H04L 1/00* (2006.01)
(52) U.S. Cl.
  CPC .......... *H04L 1/1819* (2013.01); *H04L 1/0003* (2013.01); *H04L 1/0009* (2013.01); *H04L 1/1887* (2013.01)

(56) References Cited

U.S. PATENT DOCUMENTS

| | | | | |
|---|---|---|---|---|
| 2009/0190536 | A1* | 7/2009 | Zhang | H04B 7/15592 370/329 |
| 2009/0245331 | A1* | 10/2009 | Palanki | H04L 5/0053 375/148 |
| 2009/0316763 | A1* | 12/2009 | Erkip | H04L 25/20 375/211 |
| 2009/0325479 | A1* | 12/2009 | Chakrabarti | H04B 7/0417 455/7 |
| 2010/0077274 | A1* | 3/2010 | Kim | H04L 1/0026 714/750 |
| 2010/0254301 | A1* | 10/2010 | Blankenship | H04W 72/085 370/315 |
| 2010/0296432 | A1* | 11/2010 | Mehta | H04B 7/15592 370/315 |
| 2011/0170457 | A1* | 7/2011 | Uppal | H04B 7/15557 370/277 |

FOREIGN PATENT DOCUMENTS

| | | |
|---|---|---|
| WO | WO 2010/101366 A2 | 9/2010 |
| WO | WO 2010/114344 A2 | 10/2010 |

* cited by examiner (a)

(b)

(a)

(b)

(a) data encoded for $U_1$ (b) data encoded for $U_2$

METHOD AND APPARATUS FOR TRANSMITTING AND RECEIVING DATA IN A WIRELESS COMMUNICATION SYSTEM THAT SUPPORTS A RELAY NODE

CROSS REFERENCE TO RELATED APPLICATIONS

This application is the National Phase of PCT/KR2012/003003 filed on Apr. 19, 2012, which claims priority under 35 U.S.C. 119(e) to U.S. Provisional Application No. 61/477,150 filed on Apr. 19, 2011, all of which are hereby expressly incorporated by reference into the present application.

TECHNICAL FIELD

The present invention relates to a wireless communication system, and more particularly, to a method and apparatus for transmitting and receiving data in a wireless communication system that supports a relay node.

BACKGROUND ART

FIG. 1 illustrates a relay node (RN) 120 and user equipments (UE) 131 and 132, which exist within one base station (eNodeB; eNB) 110 in a wireless communication system 100. The relay node 120 may forward data received from the base station 110 to the user equipment 132 therein and forward the data received from the user equipment 132 therein to the base station 110. Also, the relay node 120 may extend a high data rate region, enhance communication quality at a cell edge, and support communication inside a building or a zone beyond base station service coverage. In FIG. 1, a user equipment (hereinafter, referred to as macro-user equipment (Macro-UE or M-UE)) such as the user equipment 131, which directly receives a service from the base station, and a user equipment (hereinafter, referred to as relay-user equipment (Relay-UE or R-UE)) such as the user equipment 132, which receives a service from the relay node 120, are shown.

A wireless link between the base station 110 and the relay node 120 will be referred to as a backhaul link, a link from the base station 110 to the relay node 120 will be referred to as a backhaul downlink, and a link from the relay node 120 to the base station 110 will be referred to as a backhaul uplink. Also, a wireless link between the relay node 120 and the user equipment 132 will be referred to as an access link. A link from the relay node 120 to the user equipment 132 will be referred to as an access downlink, and a link from the user equipment 132 to the relay node 120 will be referred to as an access uplink.

Furthermore, in the case that the relay node 120 is operated in such a way to control a cell by itself, the user equipment 132 may recognize the relay node 120 as a normal base station.

DISCLOSURE OF THE INVENTION

Technical Problems

Accordingly, an object of the present invention devised to solve the conventional problem is to provide a method, for transmitting data successfully by using a radio resource more efficiently when a base station transmits the data to a user equipment through a user equipment-relay node. More specifically, another object of the present invention is to provide a method for configuring data to be forwarded through a user equipment-relay node and data to be directly transmitted from a base station to a user equipment when the base station transmits the data to the user equipment. Other object of the present invention is to provide a method for determining a resource and a transmission rate, which are used to forward data from a user equipment-relay node to a user equipment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, a method for transmitting data from a relay node to a user equipment comprises the steps of receiving information on a first condition related to transmission of the data from a base station; receiving first data including a plurality of sequential codes from the base station; and transmitting second data corresponding a part of the first data to the user equipment in accordance with the first condition if decoding of the first code of the plurality of codes is successfully performed.

Also, the relay node may transmit the other codes of the plurality of codes to the user equipment in accordance with the first condition.

Also, the relay node may repeatedly transmit a single code next to the first code of the plurality of codes to the user equipment in accordance with the first condition.

Also, the relay node may repeatedly transmit a single code having priority of the plurality of codes to the user equipment in accordance with the first condition.

Also, the method may further comprise the steps of receiving first control information from the user equipment, the first control information indicating whether the user equipment has received the second data; and transmitting the first control information to the base station.

Also, the method may further comprise the step of receiving information as to whether the relay node transmits the second data to the user equipment, from the base station in response to the first control information, wherein the first control information may be ACK information or HARQ NACK information.

Also, the method may further comprise the step of transmitting second control information on reception of the first data to the base station, wherein the second control information may be ACK information or HARQ NACK information.

To achieve these objects and other advantages and in accordance with the purpose of the invention, according to another aspect of the present invention, a method for receiving data in a user equipment from a relay node and a base station comprises the steps of receiving information on a first condition related to reception of the data from the base station; receiving first data including a plurality of sequential codes from the base station; receiving second data corresponding a part of the first data from the user equipment; and decoding the first data and the second data in accordance with the first condition.

Also, the method may further comprise the step of transmitting first control information on reception of the second data to the relay node, wherein the first control information may be ACK information or HARQ NACK information.

To achieve these objects and other advantages and in accordance with the purpose of the invention, according to another aspect of the present invention, a method for transmitting first data from a base station to a relay node and a user equipment comprises the steps of transmitting information on a first condition related to transmission of the first data to the relay node and the user equipment; receiving first control information from the relay node, the first control information indicating whether the user equipment has received second data transmitted from the relay node; and transmitting information as to whether the relay node transmits the second data to the user equipment, by using the first control information.

Also, the method may further comprise the step of receiving second control information indicating whether the relay node has received the first data, from the relay node, wherein the first control information and the second control information are used to determine whether the relay node transmits the second data to the user equipment.

Also, the first control information and the second information may be ACK information or HARQ NACK information.

To achieve these objects and other advantages and in accordance with the purpose of the invention, according to still another aspect of the present invention, a relay node transmitting data to a user equipment comprises a processor; a reception module receiving information on a first condition related to transmission of the data from a base station and receiving first data including a plurality of sequential codes from the base station; and a transmission module transmitting second data corresponding a part of the first data to the user equipment in accordance with the first condition if decoding of the first code of the plurality of codes is successfully performed under the control of the processor.

Also, the processor may control such that the other codes of the plurality of codes are transmitted to the user equipment in accordance with the first condition.

Also, the processor may control such, that a single code next to the first code of the plurality of codes is repeatedly transmitted to the user equipment in accordance with the first condition.

Also, the processor may control such that a single code having priority of the plurality of codes is repeatedly transmitted to the user equipment in accordance with the first condition.

Also, if the reception module receives first control information from the user equipment, the first control information indicating whether the user equipment has received the second data, the processor may transmit the first control information to the base station and receive information as to whether the relay node transmits the second data to the user equipment, from the base station in response to the first control information, and the first control information may be ACK information or HARQ NACK information.

Also, the processor may control such that second control information on reception of the first data is transmitted to the base station, and the second control information is ACK information or HARQ NACK information.

To achieve these objects and other advantages and in accordance with the purpose of the invention, according to further still another aspect of the present invention, a user equipment for receiving data from a relay node and a base station comprises a transmission module; a reception module receiving information on a first condition related to reception of the data from the base station, receiving first data including a plurality of sequential codes from the base station, and receiving second data corresponding a part of the first data from the relay node; and a processor decoding the first data and the second data in accordance with the first condition, wherein the processor controls such that the transmission module transmits first control information on reception of the second data to the relay node, and the first control information is ACK information or HARQ NACK information.

To achieve these objects and other advantages and in accordance with the purpose of the invention, according to further still another aspect of the present invention, a base station for transmitting first data to a relay node and a user equipment comprises a transmission module transmitting information on a first condition related to transmission of the first data to the relay node and the user equipment; a reception module receiving first control information from the relay node, the first control information indicating whether the user equipment has received second data transmitted from the relay node; and a processor transmitting information as to whether the relay node transmits the second data to the user equipment, by using the first control information, wherein the first control information and the second information are ACK information or HARQ NACK information.

Advantageous Effects

According to the present invention, when a base station transmits data to a user equipment through a user equipment-relay node without a direct control message exchange (or when a control message cannot be exchanged between the base station and the user equipment), a method for using a radio resource more efficiently and performing data forwarding successfully may be provided.

Also, a method for configuring data to be forwarded through a user equipment-relay node and data to be directly transmitted from a base station to a user equipment may be provided when the base station transmits the data to the user equipment. Moreover, a method for determining a resource and a transmission rate, which are used to forward data from a user equipment-relay node to a user equipment, may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
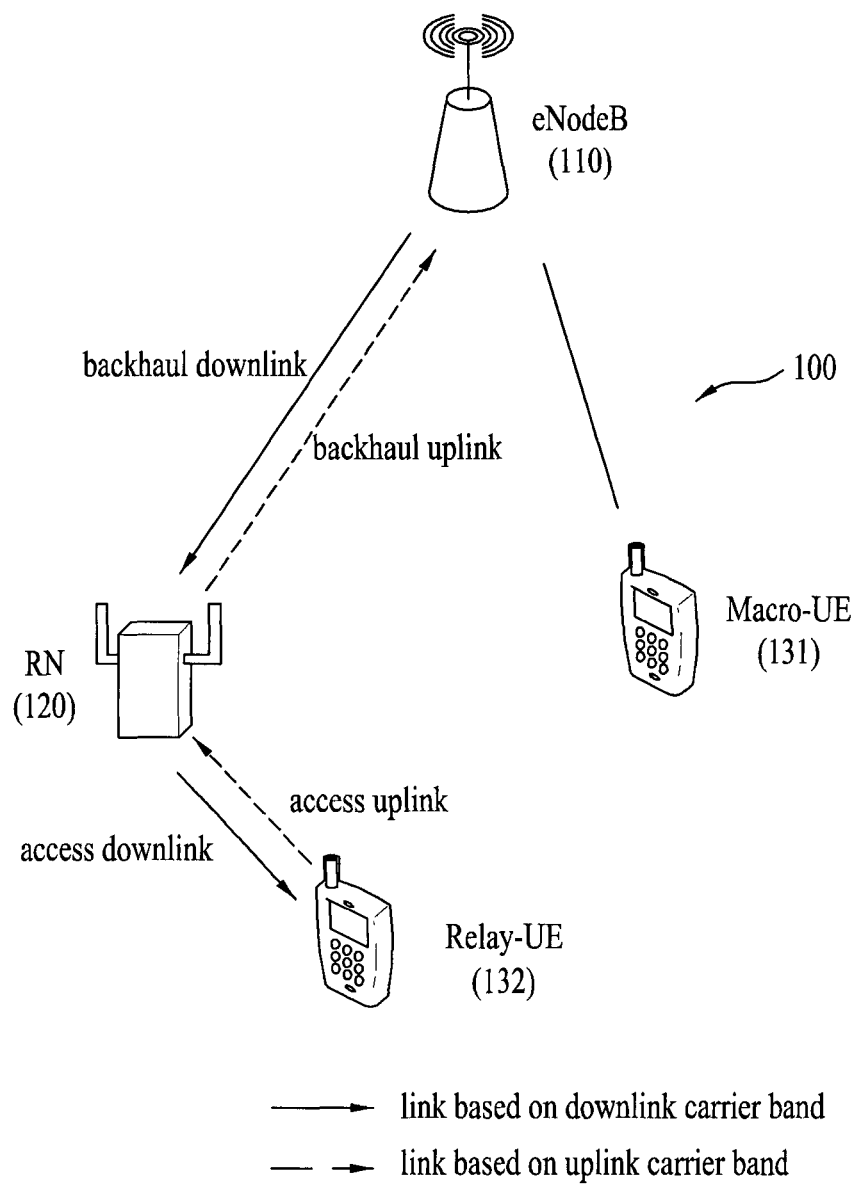
FIG. 1 is a diagram illustrating a wireless communication system that includes a base station, a relay node and user equipments.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the base station (BS) may be replaced with terms such as a fixed station, Node B, eNode B (eNB), and an access point (AP). Also, in this specification, the term, base station may be used as a concept that includes a cell or sector. Meanwhile, a relay may be replaced with a relay node (RN) or a relay station (RS). The terminal may be replaced with terms such as a user equipment (UE), a mobile station (MS), a mobile subscriber station (MSS), an advanced mobile station (AMS), or a subscriber station (SS).

Also, specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

Figure 2:
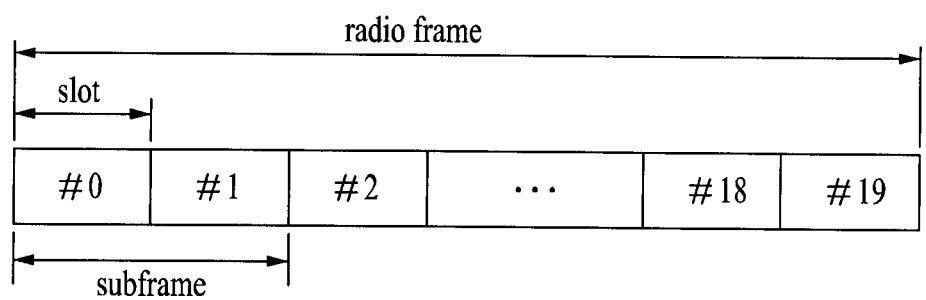
FIG. 2 is a diagram illustrating a structure of a radio frame used in a 3GPP LTE system.

FIG. 2 is a diagram illustrating a structure of a radio frame used in a 3GPP LTE system. One radio frame includes ten (10) subframes, each of which includes two slots in a time domain. The time required to transmit one subframe will be defined as a transmission time interval (TTI). For example, one subframe may have a length of 1 ms, and one slot may have a length of 0.5 ms. One slot may include a plurality of OFDM symbols in the time domain. Since the 3GPP LTE system uses an OFDMA mode in a downlink, the OFDM symbols represent one symbol period. One symbol may be referred to as an SC-FDMA symbol or symbol length in an uplink. A resource block (RB) is a resource allocation unit, and includes a plurality of continuous subcarriers in one slot. The aforementioned structure of the radio frame is only exemplary. Accordingly, various modifications may be made in the number of subframes included in the radio frame, the number of slots included in one subframe, or the number of OFDM symbols included in one slot.

Figure 3:
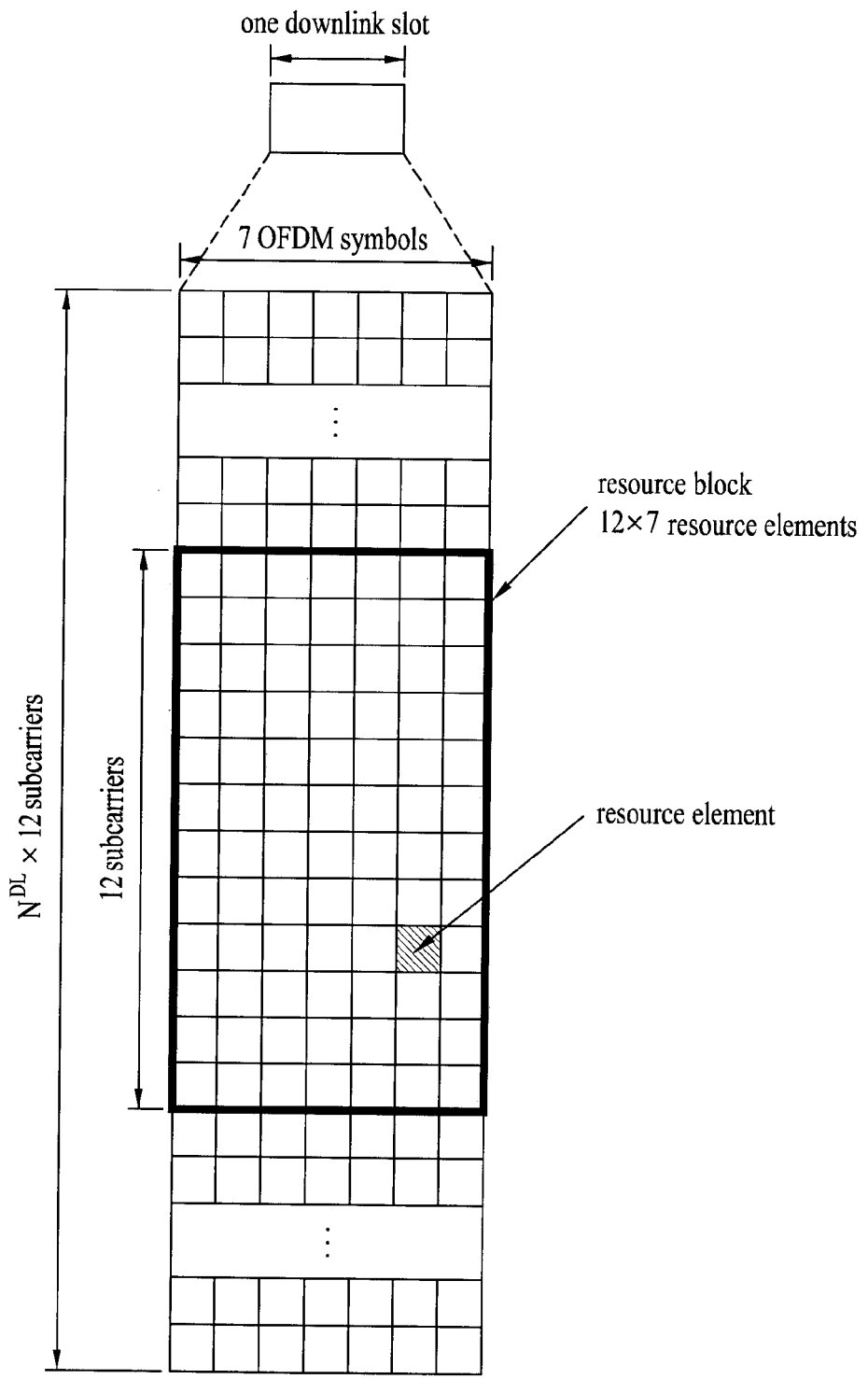
FIG. 3 is a diagram illustrating a resource grid of a downlink slot.

FIG. 3 is a diagram illustrating a resource grid of a downlink slot. Although FIG. 3 illustrates that one downlink slot includes seven OFDM symbols in a time domain and one resource block includes twelve subcarriers in a frequency domain, the present invention is not limited to the example of FIG. 3. For example, although one slot includes seven OFDM symbols in case of normal cyclic prefix (CP), one slot may include six OFDM symbols in case of extended CP. Each element on the resource grid will be referred to as a resource element (RE). One resource block (RB) includes 12×7 resource elements. The number $N^{DL}$ of resource blocks (RBs) included in the downlink slot depends on a downlink transmission bandwidth. A structure of the uplink slot may be the same as that of the downlink slot.

Figure 4:
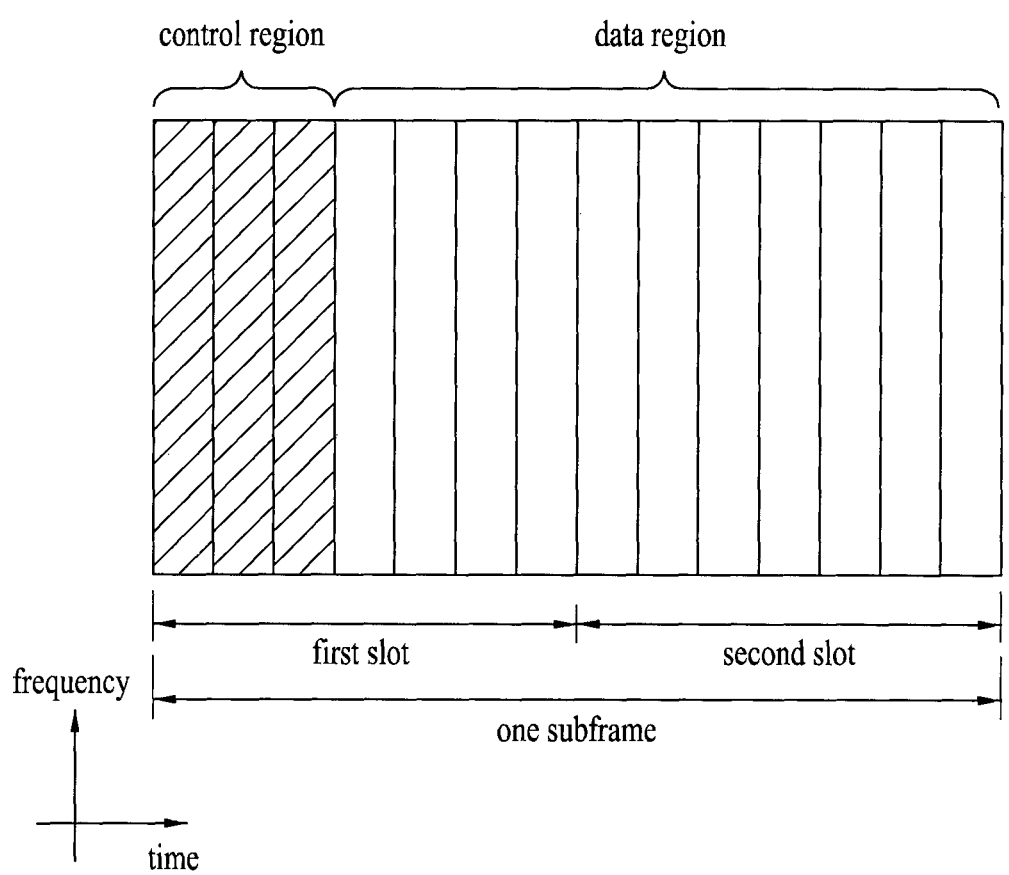
FIG. 4 is a diagram illustrating a structure of a downlink subframe.

FIG. 4 is a diagram illustrating a structure of a downlink subframe. Maximum three OFDM symbols located at the front of the first slot within one subframe correspond to a control region to which a control channel is allocated. The other OFDM symbols correspond to a data region to which a physical downlink shared channel (PDSCH) is allocated. Examples of the downlink control channel used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) in response to uplink transmission. Control information transmitted through the PDCCH will be referred to as downlink control information (DCI). The DCI includes uplink or downlink scheduling information or uplink transmission power control command for a random user equipment group. The PDCCH may include resource allocation and transport format of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region. The user equipment may monitor the plurality of PDCCHs. The PDCCH is transmitted by aggregation of one or a plurality of continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The number of CCEs used for PDCCH transmission will be referred to as a CCE aggregation level. Also, the CCE aggregation level is a CCE unit for searching for the PDCCH. The size of the CCE aggregation level is defined as the number of neighboring CCEs. For example, the CCE aggregation level may be 1, 2, 4 or 8.

The base station determines a PDCCH format depending on the DCI transmitted to the user equipment, and attaches cyclic redundancy check (CRC) to the control information. The CRC is masked with an identifier (for example, radio network temporary identifier (RNTI)) depending on usage of the PDCCH or user of the PDCCH. If the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), a system information identifier and system information RNTI (SI-RNTI) may be masked with the CRC. In order to represent a random access response which is the response to transmission of a random access preamble of the user equipment, a random access RNTI (RA-RNTI) may be masked with the CRC.

Figure 5:
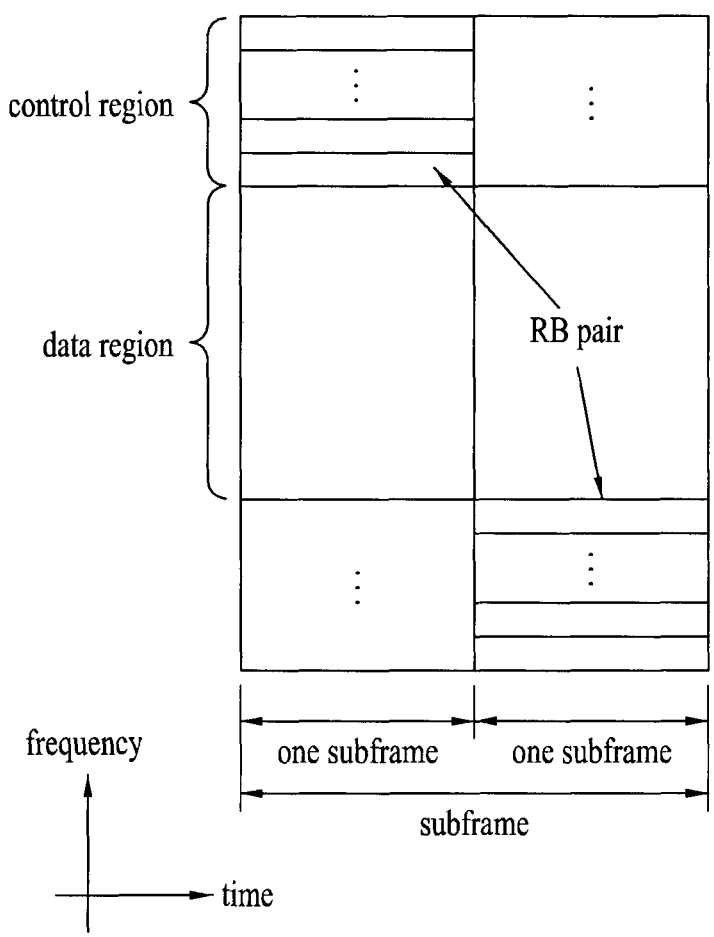
FIG. 5 is a diagram illustrating a structure of an uplink subframe.

FIG. 5 is a diagram illustrating a structure of an uplink subframe. The uplink subframe may be divided into a control region and a data region in a frequency domain. A physical uplink control channel (PUCCH), which includes uplink control information, is allocated to the control region. A physical uplink shared channel (PUSCH), which includes user data, is allocated to the data region. In order to maintain single carrier features, one user equipment does not transmit the PUCCH and the PUSCH at the same time. The PUCCH for one user equipment is allocated to resource block (RB) pair at the subframe. Resource blocks belonging to the RB pair occupy different subcarriers for two slots. This will be referred to as frequency hopping performed by the RB pair, which is allocated to the PUCCH, at a slot edge.

Modeling of MIMO System

Figure 6:
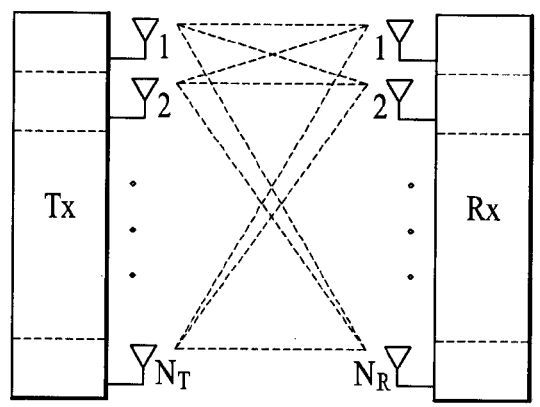
FIG. 6 is a schematic diagram illustrating a wireless communication system having multiple antennas.
Figure 6:
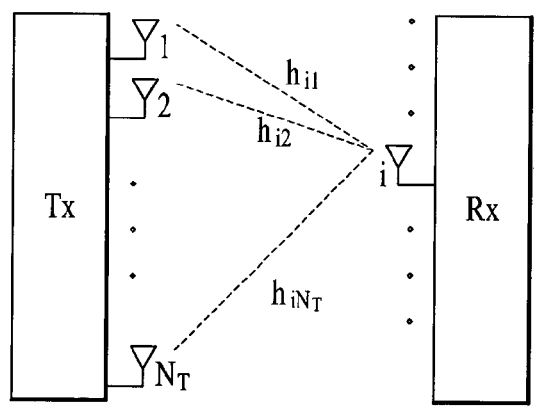

FIG. 6 is a schematic view illustrating a wireless communication system provided with multiple antennas.

As shown in FIG. 6(a), if the number of transmitting antennas increases to $N_T$ and the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate based on increase of channel transmission capacity may increase theoretically as much as a value obtained by multiplying a maximum transmission rate $R_0$, which corresponds to a case where a single antenna is used, by an increase rate $R_i$, as follows.

$$R_i = \min(N_T, N_R) \qquad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s=[s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix W serves to properly distribute the transmission information to each antenna in accordance with the transmission channel status. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix} = W\hat{s} = WPs \quad \text{[Equation 5]}$$

In this case, $W_{ij}$ means a weight value between the ith transmitting antenna and the jth information. W may be referred to as a precoding matrix.

If there exist $N_R$ receiving antennas, receiving signals $y_1, y_2, \ldots, y_{N_R}$ of the respective antennas may be expressed by a vector as follows.

$$y=[y_1, y_2, \ldots, y_{N_R}]^T \quad \text{[Equation 6]}$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

FIG. 6(b) illustrates channels from $N_T$ transmitting antennas from the receiving antenna i. Several channels may be grouped into one and then may be expressed by a vector type or a matrix type. As shown in FIG. 6(b), the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n=[n_1, n_2, \ldots, n_{N_R}]^T \quad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_i \\ \vdots \\ x_{N_R} \end{bmatrix} + \begin{bmatrix} n_1 \\ n_2 \\ \vdots \\ n_i \\ \vdots \\ n_{N_R} \end{bmatrix} = Hx+n \quad \text{[Equation 10]}$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H) of the channel matrix H may be limited as follows.

$$\text{rank}(H) \leq \min(N_T, N_R) \qquad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

Multiple User-MIMO Operation

Multiple User-MIMO (MU-MIMO) means an operation performed by a base station provided with multiple antennas to simultaneously support a plurality of users (user equipments). If a plurality of users are simultaneously supported by one base station, a signal for one user equipment may act as interference with another user equipment, whereby full system performance may be deteriorated. Accordingly, for normal data transmission and reception based on the MU-MIMO operation, it is required that interference between the users should be removed. To this end, signal processing based on an interference subtraction scheme may be performed for the signal to be transmitted from the base station to multiple users.

The base station may encode an information block to be transmitted to each user equipment by using each independent codeword. The encoded codewords may be transmitted in accordance with the interference subtraction scheme. For example, the base station may transmit the codewords to a plurality of user equipments by pre-subtracting interference. As a signal transmitted to one user equipment $U_1$ is pre-subtracted by a signal transmitted to another user equipment $U_2$, the user equipment $U_2$ may receive the signal from the base station without interference, whereby the user equipment $U_2$ may not perform separate interference subtraction operation. Examples of the interference subtraction scheme may include a zero forcing-dirty paper coding (ZF-DPC) scheme and a zero forcing (ZF) scheme.

First of all, the ZF-DPC scheme will be described. Supposing that two user equipments $U_1$ and $U_2$ simultaneously supported by one base station are provided, a hybrid channel $H = [h_1 \; h_2]$ of a channel h1 of $U_1$ and a channel h2 of $U_2$ may be obtained. If LQ decomposition is performed for the hybrid channel H, the hybrid channel may be decomposed into a lower triangular matrix L and an orthogonal matrix Q as expressed by the following Equation 12.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix} \qquad \text{[Equation 12]}$$

In the above Equation 12, if MIMO transmission is performed using a column of the matrix Q as a beamforming vector, the lower triangular matrix L only remains in the signal received by the user equipment. If the base station knows channel environments of the respective user equipments, it may perform encoding in such a way to transmit a component encoded without interference of the first row by avoiding an interference component of the second row. In this case, supposing that a beamforming vector $w_i$ (that is, beamforming vector of $U_1$ is $w_1$ and beamforming vector of $U_2$ is $w_2$) is $w_i = q_i$, an effective channel may be expressed by the following Equation 13. Accordingly, since a signal to one user equipment may be transmitted as interference from a signal of another user equipment is pre-subtracted, the corresponding user equipment may normally receive the signal from the base station without separate operation for removing interference.

$$h_i w_k = \begin{cases} l_{ii} & i = k \\ 0 & i \neq k \end{cases} \qquad \text{[Equation 13]}$$

Next, in case of ZF beamforming, interference may be removed for the hybrid channel H for multiple users through pseudo-inverse as expressed by the following Equation 14.

$$F = H^H (H H^H)^{-1} \qquad \text{[Equation 14]}$$

In the above Equation 14, $X^H$ means a hermit matrix for the matrix X, and $X^{-1}$ means an inverse matrix for the matrix X. each column of the matrix F in the Equation 14 becomes a beamforming vector for each user equipment. In other words, $w_i = f_i$ is obtained. In this case, an effective channel for each user equipment may be expressed by the following Equation 15.

$$h_i w_k = \begin{cases} \dfrac{1}{\|w_i\|} & i = k \\ 0 & i \neq k \end{cases} \qquad \text{[Equation 15]}$$

If the ZF scheme is used, a channel in each user equipment has a format of an identity matrix, whereby the user equipment may receive a signal of which interference is pre-subtracted.

Relay Node

The relay node may be considered to expand high data rate coverage, improve group mobility, arrange a temporary network, improve cell edge performance and/or provide network coverage to a new zone.

Referring to FIG. 1 again, the relay node 120 serves to forward transmission and reception between the base station 110 and the user equipment 132. Two types of links (backhaul link and access link) having different attributes are applied to each carrier frequency band. The base station 110 may include a donor cell. The relay node 120 may be connected with a radio-access network in a radio mode through a donor cell 110.

If a backhaul link between the base station 110 and the relay node 120 uses a downlink frequency band or downlink subframe resource, it may be referred to as a backhaul downlink. If the backhaul link between the base station 110 and the relay node 120 uses an uplink frequency band or uplink subframe resource, it may be referred to as a backhaul uplink. In this case, the frequency band is a resource allocated in a frequency division duplex (FDD) mode, and the subframe is a resource allocated in a time division duplex (TDD) mode. Similarly, if an access link between the relay node 120 and the user equipment 132 uses a downlink frequency band or downlink subframe resource, it may be referred to as an access downlink. Also, if the access link between the relay node 120 and the user equipment 132 uses an uplink frequency band or uplink subframe resource, it may be referred to as an access uplink. FIG. 1 illustrates configuration of the backhaul uplink/downlink and access uplink/downlink in an FDD mode relay node.

The base station is required to receive the uplink and transmit the downlink, while the user equipment is required to transmit the uplink and receive the downlink. Meanwhile, the relay node is required to transmit the backhaul uplink to the base station, receive the access uplink from the user equipment, receive the backhaul downlink from the base station, and transmit the access downlink to the user equipment.

In the mean time, in respect of band (or spectrum) use of the relay node, the case where the backhaul link is operated at the same frequency band as that of the access link will be referred to as 'in-band', and the case where the backhaul link and the access link operated at different frequency bands will be referred to as 'out-band'. In case of both in-band and out-band, the user equipment (hereinafter, referred to as legacy user equipment) operated in accordance with the existing LTE system (for example, release-8) should access a donor cell.

The relay node may be divided into a transparent relay node or a non-transparent relay node depending on whether the user equipment recognizes the relay node. The transparent relay node means that the user equipment fails to recognize communication with the network through the relay node. The non-transparent relay node means that the user equipment recognizes communication with the network through the relay node.

In respect of control of the relay node, a relay node configured as a part of the donor cell or a relay node controlling a cell by itself may be provided.

Although the relay node configured as a part of the donor cell has a relay node identifier (ID), it does not have its cell identity. If at least a part of radio resource management (RRM) is controlled by the base station to which the donor cell belongs (even though the other portions of the RRM are located in the relay node), it may be referred to as the relay node configured as a part of the donor cell. Preferably, the relay node may support the legacy user equipment. For example, examples of this relay node may include various types of L2 (second layer) relay nodes, decode-and-forward relays and smart repeaters, and type-2 relay node.

In case of the relay node controlling a cell by itself, the relay node controls one or more cells, unique physical layer cell identity is provided to each of the cells controlled by the relay node, and the same RRM mechanism may be used. In view of the user equipment, there is no difference between access to the cell controlled by the relay node and access to the cell controlled by the base station. Preferably, the cell controlled by the relay node may support the legacy user equipment. For example, example of this relay node include a self-backhauling relay node, an L3 (third layer) relay node, a type-1 relay node and a type-1a relay node.

The type-1 relay node is an in-band relay node and controls a plurality of cells, each of which is regarded as a separate cell different from the donor cell in view of the user equipment. Also, each of the plurality of cells may have its physical cell ID (defined in LTE release-8), and the relay node may transmit its synchronization channel, reference signal, etc. In case of single-cell operation, the user equipment may directly receive scheduling information and HARQ feedback from the relay node and transmit its control channel (scheduling request (SR), CQI, ACK/NACK, etc.) to the relay node. Also, the type-1 relay node is regarded as the legacy base station (base station operated in accordance with the LTE release-8 system) by the legacy user equipments (user equipments operated in accordance with the LTE release-8 system). In other words, the type-1 relay node backward compatibility. Meanwhile, the type-1 relay node is regarded as another base station different from the legacy base station by the user equipments operated in accordance with the LTE-A system, whereby performance may be improved.

The type-1a relay node has the same features as those of the aforementioned type-1 relay node except that it is operated in accordance with out-band. The operation of the type-1a relay node may be configured so as to be affected by the operation of L1 (first layer) within the minimum range, or may be configured so as not to be affected by the operation of L1 (first layer).

The type-2 relay node is an in-band relay node, and does not have separate physical cell ID, whereby a new cell is not formed. The type-2 relay node is transparent with respect to the legacy user equipment, and the legacy user equipment fails to recognize the presence of the type-2 relay node. Although the type-2 relay node may transmit the PDSCH, it does not transmit at least CRS and PDCCH.

Hybrid Automatic Retransmission Request (HARQ) Operation

As a control method for reception failure of data, the following HARQ operation may be used. If a data transmitting side receives ACK signal from a data receiving side after transmitting one packet, it may transmit a new packet. If the data transmitting side receives NACK signal from the data receiving side, it may retransmit a previously transmitted packet. At this time, a packet to which encoding based on a forward error correction (FEC) function is applied may be retransmitted. Accordingly, as a result of receiving and decoding one packet, the data receiving side transmits ACK signal if decoding is successfully performed, and transmits NACK signal if decoding is failed and stores the received packet in a buffer. If the retransmitted packet based on the NACK signal is received, the data receiving side performs decoding for the received packet together with the packet stored in the buffer, whereby a receiving success rate of the packet may be enhanced.

The HARQ scheme may be divided into a synchronous HARQ scheme and an asynchronous HARQ scheme in accordance with retransmission timing. In case of the synchronous HARQ scheme, if initial transmission has been failed, retransmission is performed at the time defined by the system. For example, if retransmission is defined to be performed at every fourth time unit (for example, subframe) after initial transmission is failed, it is not required to additionally notify the receiving side of information on the retransmission timing. Accordingly, if the data transmitting side receives the NACK signal, it retransmits the packet at every fourth time unit until it receives the ACK signal. Meanwhile, according to the asynchronous HARQ scheme, information on the retransmission time is separately scheduled. Accordingly, the retransmission timing of the packet corresponding to the NACK signal may be changed by several conditions such as a channel status.

Also, the HARQ scheme may be divided into an adaptive HARQ scheme and a non-adaptive HARQ scheme depending on whether a channel status is reflected in the quantity of a resource used for retransmission. In the non-adaptive HARQ scheme, MCS level of the retransmitted packet, the number of used resource blocks, etc. are defined during initial transmission. For example, if the transmitting side transmits data by using eight resource blocks during initial transmission, it retransmits the data by equally using eight resource blocks during retransmission. Meanwhile, in the adaptive HARQ scheme, a modulation mode of packet, the number of used resource blocks, etc. are varied depending on a channel status. For example, even if transmission is initially performed using eight resource blocks, retransmission may be performed using resource blocks greater or smaller than eight resource blocks depending on the channel status.

In data packet transmission operation through the aforementioned HARQ, the transmitting side may perform initial transmission and retransmission in a sub-packet unit by converting a data packet into sub-packets of a predetermined size. The receiving side may try decoding of the data packet by combining several sub-packets.

Several sub-packets used for initial transmission and retransmission according to the HARQ scheme are generated from one codeword packet. At this time, the generated sub-packets may be identified by their length and start position. The sub-packets that may be identified will be referred to as redundancy versions (RV). The receiving side may try decoding of all the codewords by receiving and combining different RVs. For example, the HARQ operation may be performed in such a manner that the receiving side receives RVs corresponding to the difference between all the codeword packets to be received and previously received sub-packets and tries decoding for the received RVs. This HARQ operation may be referred to as incremental redundancy (IR) based HARQ operation.

Partial Signal Forwarding Through Relay Node in Multi-User Environment

Figure 7:
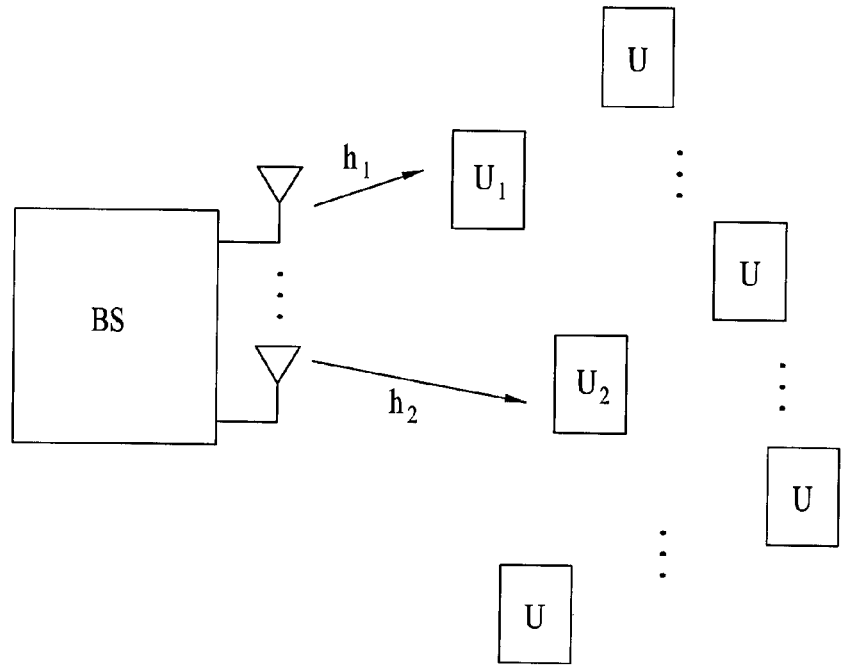
FIG. 7 is a diagram conceptionally illustrating a multi-user environment.
Figure 7:
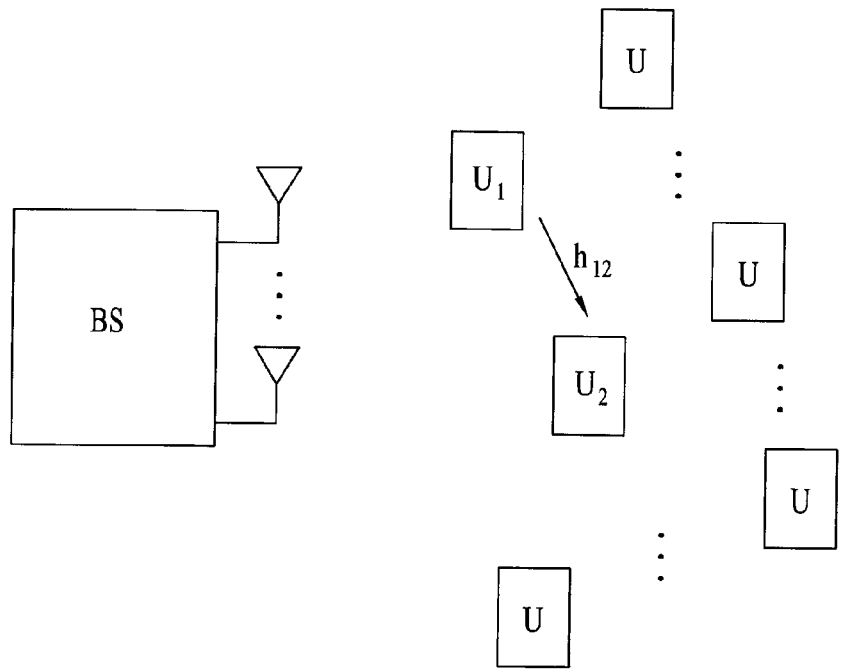

FIG. 7 is a diagram conceptually illustrating a multi-user environment. In the example of FIG. 7, it is assumed that the base station is provided with multiple antennas and supports MU-MIMO transmission and that the user equipments $U_1$, $U_2$, . . . are provided with a single antenna. This assumption is only exemplary for clarification of description, and the principle of the present invention, which will be described hereinafter, may equally be applied to user equipment(s) provided with multiple antennas.

Referring to FIG. 7(a), a plurality of user equipments $U_1$, $U_2$, . . . may simultaneously receive a signal from the base station BS. A channel to the user equipment $U_1$ may be referred to as $h_1$, and a channel to the user equipment $U_2$ may be referred to as $h_2$. It is assumed that the user equipment $U_1$ is located at a place close to the base station and has a good channel status, whereas the user equipment $U_2$ is located at a relatively cell edge as compared with the user equipment $U_1$ and has a poor channel status. In order to ensure data transmission for the user equipment having a poor channel status, the base station may transmit a signal at a higher power. However, in this case, a problem occurs in that interference may be caused. In order to solve this problem, various relay nodes may be provided as described above. However, since a new relay node is provided on the network, a separate resource should be used. In this respect, it may be considered that the user equipment having a good channel status serves as the relay node. This relay node will be referred to as UE-relay, which may correspond to the aforementioned type-2 relay node. In other words, the UE-relay is transparent for the user equipment to which data are forwarded.

FIG. 7(b) illustrates that the user equipment $U_1$ serves as the UE-relay and the user equipment $U_2$ receives data from the base station through the user equipment $U_1$. In this way, data transmission is performed through cooperation between the user equipments in the multi-user environment, whereby full transmission capacity may be improved and efficiency in use of resource may be increased. For example, the user equipment $U_1$ having a better channel environment with the base station than the other user equipment may serve as the UE-relay and assist data forwarding to the other user equipment $U_2$ having a poor channel environment. In more detail, the user equipment $U_1$ may receive its data from the base station and at the same time receive data, which are transmitted from the base station to the user equipment $U_2$, from the base station. The user equipment $U_1$ may forward data, which are to be forwarded to the user equipment $U_2$ among the data received therein, to the user equipment $U_2$. The user equipment $U_2$ may acquire its data through the data directly received from the base station and the data forwarded through the user equipment $U_1$. This data transmission scheme may be referred to as a partial signal forwarding scheme.

In order to perform information forwarding based on the UE-relay in the aforementioned multi-user environment, a method for encoding an information bit to be forwarded from a base station to each user equipment should be determined. Hereinafter, various embodiments of the present invention for the method for encoding information bits from the base station and information forwarding operation through the UE-relay will be described in detail.

Figure 8:
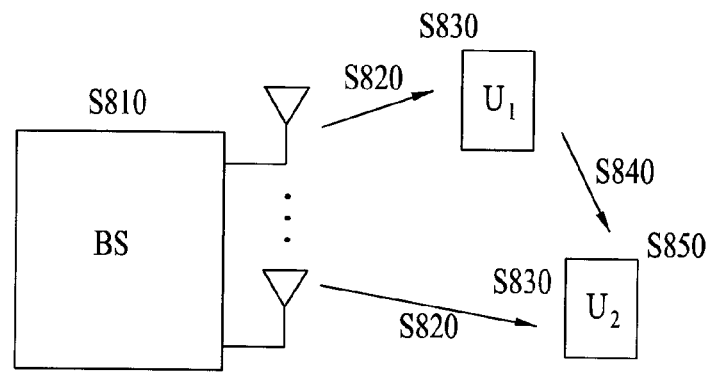
FIG. 8 is a diagram illustrating a flow of an operation of information forwarding through a user equipment-relay node in a multi-user environment.

FIG. 8 is a diagram illustrating a flow of an operation of information forwarding through a user equipment-relay node in a multi-user environment. For clarification of description, the other user equipments of the multi-user environment except for the user equipments $U_1$ and $U_2$ are not shown in FIG. 8. However, the range of the present invention is not limited to the example of FIG. 8, and the principle of the present invention may equally be applied to a case where MU-MIMO transmission is performed for two or more user equipments and any one of the two or more user equipments serves as a UE-relay for the other user equipment(s). In FIG. 8, the user equipment $U_1$ represents the user equipment that serves as the UE-relay, and the user equipment $U_2$ represents the user equipment, which serves as a destination of information transmission, and may be referred to as a destination user equipment.

Referring to FIG. 8, the base station may encode data for each of the user equipment (S810), transmit the encoded data to each of the user equipments $U_1$ and $U_2$ (S820), recover the data received from the user equipment $U_1$ (S830), and transmit the data for the user equipment $U_2$ among the recovered data to the user equipment $U_2$ (S840), and the user equipment $U_2$ may recover its data by using the signal received at the steps S820 and S840 (S850). A detailed operation at each step will be described below.

Figure 9:
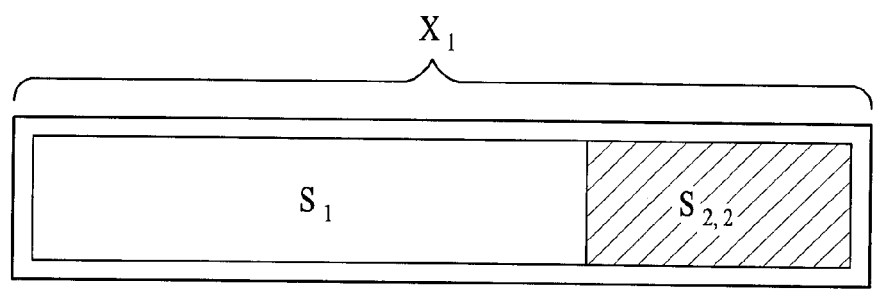
FIG. 9 is a diagram illustrating encoded data in a bit concatenation based partial signal forwarding mode.
Figure 9:
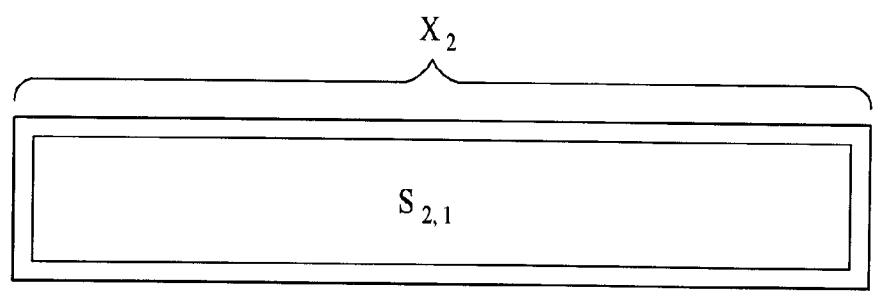

The step S810 is the step of data encoding. The base station BS may encode the data for the user equipment $U_1$, which serves as the UE-relay, and the data for the destination user equipment $U_2$, which are forwarded through the user equipment $U_1$. In more detail, data encoding for each user equipment may be performed as illustrated in FIG. 9.

FIG. 9(a) illustrates data encoded for the user equipment $U_1$, and FIG. 9(b) illustrates data encoded for the user equipment $U_2$. The information bit for the user equipment $U_1$ is referred to as $S_1$, and the information bit for the user equipment $U_2$ is referred to as $S_2$. The information bit $S_2$ is divided into an information bit $S_{2,1}$ received by the user equipment $U_2$ from the base station BS through a channel $h_2$ and an information bit $S_{2,2}$ forwarded through a channel $h_{12}$ from the UE-relay $U_1$. In this case, the information bit $S_{2,2}$ may be configured as an information bit of a part of $S_{2,1}$ (that is, $S_{2,2}$ is repeated with a part of $S_{2,1}$), or may be configured as a separate information bit different from $S_{2,1}$ (that is, $S_{2,1}$ is not repeated with $S_{2,2}$). For example, the information bit $S_{2,1}$ may correspond to a systematic bit, and the information bit $S_{2,2}$ may correspond to a parity bit. Alternatively, the information bits $S_{2,1}$ and $S_{2,2}$ may respectively correspond to a first part and a second part, which are partitioned from the output $S_2$ from a channel coder (that is, one of the partitioned part of $S_2$ corresponds to $S_{2,1}$, and the other one corresponds to $S_{2,2}$).

As illustrated in FIG. 9(a), the information bit $S_{2,2}$ for the user equipment $U_2$ may be concatenated with the information bit $S_1$ for the user equipment $U_1$ and may be encoded as one codeword. This encoding scheme may be referred to as a bit concatenation scheme. The partial signal forwarding scheme suggested in the present invention may be referred to as a bit concatenation based partial signal forwarding scheme.

As illustrated in FIG. 9(b), one codeword encoded by concatenation of $S_1$ and $S_{2,2}$ may be expressed as $X_1$. Bit rates for $S_1$ and $S_{2,2}$ in the full codeword $X_1$ may be referred to as $(1-\alpha)$ and $\alpha$, respectively (in this case, $0 \leq \alpha \leq 1$). If the transmission power per bit is uniformly is set, $(1-\alpha)$ and $\alpha$ may correspond to the transmission power rate.

As illustrated in FIG. 9(b), the information bit $S_{2,1}$ for the user equipment $U_2$ may be encoded as one independent codeword $X_2$.

At the step S820, the base station may transmit the codewords $X_1$ and $X_2$ encoded at the step S810 to the user equipments $U_1$ and $U_2$, respectively. The step S820 may be expressed as the step of broadcasting data from the base station to each user equipment at a first transmission phase. In transmitting the codewords $X_1$ and $X_2$ to the user equipments $U_1$ and $U_2$, respectively, the base station may pre-subtract interference for each user equipment by using the aforementioned interference subtraction scheme such as ZF-DPC or ZF.

Supposing that the transmission power allocated to the codeword $X_1$ transmitted to the user equipment $U_1$ is $P_1$ and the transmission power allocated to the codeword $X_2$ transmitted to the user equipment $U_2$ is $P_2$, the sum of $P_1$ and $P_2$ does not exceed the maximum transmission power $P_{BS}$ of the base station.

At the first transmission phase, the signals received from the respective user equipments $U_1$ and $U_2$ may be expressed by the following Equation 16.

$$\begin{aligned} y_1^{(1)} &= \sqrt{P_1}\, h_1 w_1 x_1(s_1, s_{2,2}) + \\ &\quad \sqrt{P_2}\, h_1 w_2 x_2(s_{2,1}) + n_1 \\ &= \sqrt{P_1}\, h_1 w_1 x_1(s_1, s_{2,2}) + n_1, \\ y_2^{(1)} &= \sqrt{P_1}\, h_2 w_1 x_1(s_1, s_{2,2}) + \\ &\quad \sqrt{P_2}\, h_2 w_2 x_2(s_{2,1}) + n_1 \\ &= \sqrt{P_2}\, h_2 w_2 x_2(s_{2,1}) + n_1, \end{aligned}$$
[Equation 16]

In the above Equation 16, $y_1^{(1)}$ and $y_2^{(1)}$ respectively represent the signals received by the user equipments $U_1$ and $U_2$ at the first transmission phase. $P_1$ and $P_2$ respectively represent the transmission powers allocated to the codewords $x_1$ and $x_2$, respectively. $x_1(s_1, s_{2,2})$ represent codewords encoded by being concatenated with $s_1$, $s_{2,2}$, and $x_2(s_{2,1})$ represents a codeword encoded by $s_{2,1}$. $h_1$ and $h_2$ respectively mean channels between the user equipments $U_1$ and $U_2$ from the base station. $w_1$ and $w_2$ respectively means beamforming vectors to the user equipments $U_1$ and $U_2$. The beamforming vectors may be determined as exemplarily described in accordance with the aforementioned interference pre-subtraction scheme, ZF-DPC or ZF. $n_1$ and $n_2$ respectively mean additive white Gaussian noises (AWGNs) at the user equipments $U_1$ and $U_2$.

At the step S820, transmission from the base station to the user equipment $U_1$ and transmission from the base station to the user equipment $U_2$ may be performed at the same time or different times. Also, the aforementioned first transmission phase is the terminology for expressing the order of the entire operation of information forwarding to the destination through the UE-relay.

The step S830 is the step of recovering (or decoding) data from the signals received by the user equipments $U_1$ and $U_2$ at the first transmission phase. The user equipment $U_1$ may decode the codeword $X_1$ from the signal $y_1^{(1)}$ received at the first transmission phase, and the user equipment $U_2$ may decode the codeword $X_2$ from the signal $y_2^{(1)}$ received at the first transmission phase.

In the recovered information, only information corresponding to the rate of $(1-\alpha)$ is the information on the user equipment $U_1$, and the information corresponding to the rate of $\alpha$ is the information on the other user equipment $U_2$. Accordingly, the information quantity that may be acquired by the user equipments $U_1$ and $U_2$ at the first transmission phase may be expressed by the following Equation 17.

$$\begin{aligned} R_1^{(1)} &= (1-\alpha)\log(1+P_1\gamma_1), \\ R_2^{(1)} &= \log(1+P_2\gamma_2), \end{aligned}$$
[Equation 17]

In the above Equation 17, $\gamma_1$ and $\gamma_2$ respectively mean $|h_1 w_1|^2/N_0$ and $|h_2 w_2|^2/N_0$. In this case, $N_0$ means variance of the AWGNs, $n_1$ and $n_2$, for the user equipments $U_1$ and $U_2$, which are described in the above Equation 16.

The step S840 is the step of information forwarding at a second transmission phase.

$U_1$ as the UE-relay may extract information (that is, $S_{2,2}$) on the other user equipment $U_2$, which corresponds to the rate of $\alpha$ in the information quantity recovered by the information received from the base station at the first transmission phase. The extracted data $S_{2,2}$ for the user equipment $U_2$ may be forwarded from the $U_1$ to the $U_2$ at the second transmission phase.

In this case, the $U_1$ may perform modulation for the extracted data $S_{2,2}$ by using $X_R$ and transmit the modulated data to the user equipment $U_2$. Since $X_R$ includes the data $S_{2,2}$ for the user equipment $U_2$, it may be expressed as $X_R(S_{2,2})$. The modulation scheme applied to $S_{2,2}$ may be indicated from the base station. For example, the modulation scheme to be applied by the $U_1$ for the data $S_{2,2}$, which will be forwarded to the other user equipment $U_2$, may be defined previously by previous signal exchange between the base station and the UE-relay $U_1$. Alternatively, the codeword $X_1$ generated by the base station through concatenation between the data $S_1$ for the UE-relay $U_1$ and the data $S_{2,2}$ to be forwarded to the other user equipment $U_2$ may include information indicating the modulation scheme to be applied by the user equipment $U_1$ for the data $S_{2,2}$ to be forwarded to the user equipment $U_2$.

Also, the UE-relay $U_1$ may use the maximum transmission power $P_{U1}$ to maximize efficiency of transmission to the destination user equipment $U_2$. In this case, the signal received by the user equipment $U_2$ may be expressed by the following Equation 18.

$$y_2^{(2)} = \sqrt{P_{U1}}\, h_{12} x_R(s_{2,2}) + n_{12}.$$
[Equation 18]

In the above Equation 18, $y_2^{(2)}$ represents the signal received by the user equipment $U_2$ at the second transmission phase. $P_{U1}$ represents a transmission power allocated to $x_R$. $x_R(s_{2,2})$ represents a signal modulated from the data $s_{2,2}$, which is forwarded from the $U_1$ to the $U_2$, to $x_R$ by the $U_1$. $h_{12}$ means a channel from the $U_1$ to the $U_2$. $n_{12}$ means AWGN on the $h_{12}$.

The information rate acquired by the $U_2$ from the signal received as expressed by the Equation 18 may be expressed by the following Equation 19.

$$R_2^{(2)} = \log(1 + P_{U_1} \gamma_{12}) \quad \text{[Equation 19]}$$

In the Equation 19, $R_2^{(2)}$ means an information rate acquired by the $U_2$ at the second transmission phase. Also, $\gamma_{12}$ means $|h_{12}|^2/N_0$.

In forwarding the data $S_{2,2}$ from the UE-relay $U_1$ to the destination user equipment $U_2$, the second transmission phase may be determined variably depending on the information rate for forwarding, to improve efficiency of information transmission. If the variable transmission step is considered, the time required by the UE-relay $U_1$ for information forwarding may be expressed by the following Equation 20.

[Equation 20]

$$t^{(2)} = \frac{\alpha \cdot \log(1 + P_1 \gamma_1)}{\log(1 + P_{U_1} \gamma_{12})} \times t^{(1)}$$

In the above Equation 20, $t^{(1)}$ means the time required for the first transmission phase, and $t^{(2)}$ means the time required for the second transmission phase. In this case, the time required for the second transmission phase may be determined relatively to the time required for the first transmission phase depending on a ratio of the information rate $\alpha \cdot \log(1+P_1\gamma_1)$ which the UE-relay $U_1$ may acquire the data for the destination user equipment $U_2$, which is transmitted from the base station for the first transmission phase and the information rate $\log(1+P_{U_1}\gamma_{12})$ which the destination user equipment $U_2$ may acquire data forwarded from the UE-relay $U_1$ for the second transmission phase. For example, if the time required for the first transmission phase is 4 subframes and (information rate of data for the destination user equipment $U_2$, which is acquired by the UE-relay $U_1$ for the first transmission phase)/(information rate of data acquired by the destination user equipment $U_2$ for the second transmission phase)=½, it may be set in such a manner that two subframes are required for the second transmission phase. In this case, the information rate which is acquired may be varied depending on the status of the channel ($h_1$ and/or $h_{12}$), whereby the time required for the second transmission phase may be determined variably.

Alternatively, if the time required for the first transmission phase and the time required for the second transmission phase are fixedly defined, a size of a frequency resource used for information forwarding may be determined variably. In other words, the size of the frequency resource, which will be used for the second transmission phase, may be determined variably in accordance with the principle similar to the aforementioned variable transmission time. For example, if the size (that is, the size of the frequency resource used to transmit both $S_1$ and $S_{2,2}$) of the entire frequency resource used for the first transmission phase corresponds to ten resource blocks (RBs) and (information rate of data for the destination user equipment $U_2$, which is acquired by the UE-relay $U_1$ for the first transmission phase)/(information rate of data acquired by the destination user equipment $U_2$ for the second transmission phase)=½, the frequency resource used for the second transmission phase may be set to five RBs. In this case, the information rate which is acquired may be varied depending on the status of the channel ($h_1$ and/or $h_{12}$), whereby the size of the frequency resource used for the second transmission phase may be determined variably.

In this case, the data $S_{2,2}$ which will be forwarded from the $U_1$ to the $U_2$, corresponds to the information bit generated and encoded by the base station BS, and the UE-relay $U_1$ does not perform separate processing for the data $S_{2,2}$ in addition to the aforementioned modulation and transmission. In other words, the UE-relay $U_1$ forwards the data $S_{2,2}$ for the other user equipment $U_2$ to the $U_2$ as it is received from the base station.

The step S850 is the step of recovering (or decoding) data for the $U_2$ by using the signal received for the first transmission phase and the signal received for the second transmission phase.

The UE-relay $U_1$ receives data for the first transmission phase only, whereas the destination user equipment $U_2$ receives data for both the first transmission phase and the second transmission phase. The destination user equipment $U_2$ may finally recover its data in a manner of joint-decoding through concatenation between the signal $y_2^{(1)}$ received for the first transmission phase and the signal $y_2^{(2)}$ received for the second transmission phase.

As a result, data transmission efficiency per hour in each of the user equipments $U_1$ and $U_2$ may be expressed by the following Equation 21.

$$C_1(\alpha, P_1) = \frac{t^{(1)}}{t^{(1)} + t^{(2)}} R_1^{(1)} \quad \text{[Equation 21]}$$

$$= \frac{t^{(1)}}{t^{(1)} + t^{(2)}} (1 - \alpha) \log(1 + P_1 \gamma_1),$$

$$C_2(\alpha, P_1, P_2) = \frac{t^{(1)}}{t^{(1)} + t^{(2)}} R_2^{(1)} + \frac{t^{(2)}}{t^{(1)} + t^{(2)}} R_2^{(2)}$$

$$= \frac{t^{(1)}}{t^{(1)} + t^{(2)}} \log(1 + P_2 \gamma_2) + \frac{t^{(2)}}{t^{(1)} + t^{(2)}} \log(1 + P_{U_1} \gamma_{12})$$

$$= \frac{t^{(1)}}{t^{(1)} + t^{(2)}} \{\log(1 + P_2 \gamma_2) + \alpha \cdot \log(1 + P_1 \gamma_1)\}.$$

In the above Equation 21, $C_1$ and $C_2$ respectively mean transmission efficiency for the $U_1$ and the $U_2$. $P_1$, $P_2$ and $\alpha$ may be determined depending on an information rate which is required. In other words, a ratio of data which will be forwarded to the destination user equipment $U_2$ may be determined from the transmission powers $P_1$ and $P_2$ to the $U_1$ and the $U_2$ and the data transmitted to the UE-relay $U_1$.

Also, in view of the destination user equipment $U_2$, the data received for the first transmission phase is $S_{2,1}$, and the data forwarded from the UE-relay $U_1$ for the second transmission phase is $S_{2,2}$. As described above, $S_{2,2}$ may be configured as an information bit of a part of $S_{2,1}$ (that is, $S_{2,2}$ is repeated with a part of $S_{2,1}$). In this case, since the $U_2$ performs data decoding by using the repeated information, a decoding success rate may be more increased than the case where the data is received from only the base station when the channel status is not good, and more robust data recovery may be performed. Alternatively, $S_{2,2}$ may be configured as a separate information bit different from $S_{2,1}$ (that is, $S_{2,1}$ is not repeated with $S_{2,2}$). In this case, $U_2$ may receive proper data through a direct channel from the base station and a channel from the UE-relay, whereby the received information rate may be improved.

In partial signal forwarding through the UE-relay in the aforementioned multi-user environment, the data (or a part of data) for the user equipment $U_2$ having a channel status which is not good relatively may be forwarded through the user equipment $U_1$ having a good channel status, whereby transmission efficiency may be improved. The user equipment $U_1$ having a good channel status may fulfill the information rate allocated thereto and at the same time use its extra channel capacity to forward the data for the other user equipment $U_2$. At this time, since the data for the other user equipment $U_2$ is concatenated with the data for the user equipment $U_1$ having a good channel status and transmitted as one codeword, information recovery may be performed without interference. Also, since the variable transmission time is considered during data forwarding, if the channel status between the user equipments is enough good, the time used for information forwarding becomes short and transmission efficiency is more improved. The user equipment $U_2$ having a poor channel status may receive its data through the direct channel from the base station and the channel from the UE-relay, whereby the received information rate and/or the decoding success rate may be improved.

Also, the present invention may be applied to the multi-user environment where multiple antennas are used. Also, all the user equipments serve as relay nodes, if necessary, without a separate relay node, whereby quality of service (QoS) of cell edge users having a poor channel status may be ensured. Also, as the partial signal forwarding scheme described in the present invention is used, the base station may forward a retransmission data packet to the destination user equipment together with the data of the UE-relay during HARQ based data retransmission, whereby the UE-relay may directly forward the retransmission data packet to the destination user equipment during data retransmission.

HARQ Operation Through UE-Relay

The UE-relay is not a fixed relay node but a relay node where one user equipment assists another user equipment. Cooperative communication through the UE-relay may be referred to as cooperative communication between user equipments. The UE-relay may correspond to the aforementioned type-2 relay node.

If the UE-relay is used, a destination mode (or destination user equipment) fails to recognize the presence of the UE-relay. Accordingly, information change between the relay node and the destination mode is not performed previously, and the channel status is not feed back from the destination node to the relay node. In other words, the relay node transmits data to the destination node without information on the channel between the relay node and the destination node. Data transmission from the relay node to the destination node should be performed in an open-loop mode.

If the partial signal forwarding scheme through the UE-relay is used, channels $h_1$ and $h_2$ from a source node (that is, base station) to each of the user equipments may be determined by channel status information feedback reported from each user equipment. However, the channel $h_{12}$ between the UE-relay $U_1$ and the destination node $U_2$ may be determined by an average feature of a channel instead of an actual channel environment.

In this way, if partial signal forwarding through the UE-relay is performed in an open-loop mode, it is likely that communication outage occurs. In order to correct such an error, HARQ based retransmission operation may be used. Hereinafter, various embodiments of the present invention will be described in respect of an HARQ operation method and a resource allocation method that may obtain a maximum transmission rate when data forwarding of an open-loop mode is performed through a UE-relay.

Hereinafter, according to the embodiments of the present invention, a bit concatenation based partial signal forwarding scheme suggested in the present invention may be used as a partial signal forwarding scheme through a relay node, or other normal partial signal forwarding scheme may be used.

The normal partial signal forwarding scheme means direct data transmission considering a channel status from the source node to the destination node and additional data transmission from the relay node to the destination node. The data which will be transmitted from the relay node to the destination node may be provided by the source node. In this case, the source node may directly transmit the data to the relay node, or the relay node may overhear the data transmitted from the source node to the destination node.

An example of a successive interference cancellation (SIC) based partial signal forwarding scheme will be described. According to the SIC based partial signal forwarding scheme, a signal may be transmitted from the source node to the destination node as follows.

Figure 10:
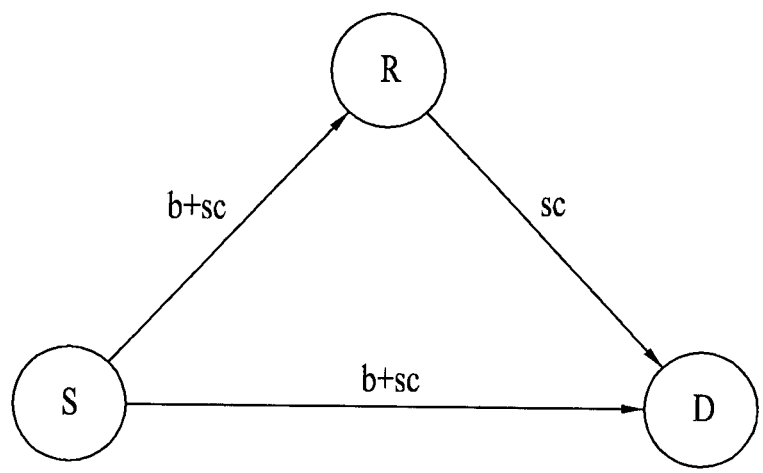
FIG. 10 is a diagram illustrating a successive interference cancellation (SIC) based partial signal forwarding operation.

FIG. 10 is a diagram illustrating a successive interference cancellation (SIC) based partial signal forwarding operation.

First of all, the source node S performs superposition coding for a basic layer and a superposed layer and then transmits the coded layer to the relay node R and the destination node D at the same time. In this case, the basic layer b corresponds to a portion directly transmitted from the source node to the destination node, and the superposed layer sc corresponds to a portion forwarded to the destination node through the relay node. When the source node performs superposition coding, a size ratio of signal powers of the basic layer b and the superposed layer sc may be determined using channel information between the source node and the relay node and channel information between the source node and the destination node.

The relay node may detect the superposed layer sc portion by first detecting and subtracting the basic layer b portion from the signal received from the source signal. The relay node may forward the superposed layer sc portion to the destination node.

The destination node may receive and detect the superposed layer sc portion forwarded from the relay node, and may detect the basic layer b portion by subtracting the detected superposed layer sc portion from the signal (b+sc) received from the source node.

A total transmission rate $R_{tot}$ that may be obtained by the aforementioned SIC based partial signal forwarding operation is expressed by the following Equation 22.

$$R_b = \min\left[\log(1 + (1-\alpha)\gamma_{sd}), \log\left(1 + \frac{(1-\alpha)\gamma_{sr}}{1+\alpha\gamma_{sr}}\right)\right] \quad \text{[Equation 22]}$$

$$R_s = \log(1 + \alpha\gamma_{sr})$$

$$R_2 = \log(1 + \gamma_{rd})$$

$$R_{tot} = \frac{R_b + R_s}{1 + R_s/R_2}$$

In the above Equation 22, $R_b$ is a transmission rate of the basic layer b, $R_s$ is a transmission rate of the superposed layer sc, and $R_2$ is a transmission rate between the relay node and the destination node. $\gamma$ represents a signal to noise ratio (SNR) for each channel. $\gamma_{sd}$ represents SNR for a channel between the source node S and the destination node D, $\gamma_{sr}$ is SNR for a channel between the source node S and the relay node R, and $\gamma_{rd}$ is SNR for a channel between the relay node R and the destination node D. α means a ratio between the basic layer b and the superposed layer sc, and (1−α) is allocated to the basic layer (b) while α is allocated to the superposed layer sc.

In the above Equation 22, since the basic layer b is detected from both the relay node and the destination node, the transmission rate $R_b$ of the basic layer b is determined by a minimum value of the transmission rate of the relay node and the transmission rate of the destination node. Also, the time required to transmit the superposed layer sc from the relay node to the destination node is determined by the ratio of $R_s$ and $R_2$.

In order to reduce the quantity and transmission time of the information forwarded from the relay node to the destination node and increase the total transmission rate $R_{tot}$, the source node may control the transmission rate. In this case, the transmission rate may be controlled based on channel information between the source node and the relay node, channel information between the source node and the destination node and channel information between the relay node and the destination node. As described above, the SIC based partial signal forwarding scheme may increase the total transmission rate by determining the time required for information forwarding from the relay node to the destination node by designating transmission rate capacity between the relay node and the destination node if the source node knows the information of all the channels. In other words, the SIC based partial signal forwarding scheme may increase the total transmission rate by accurately controlling the transmission rate in a closed-loop environment.

However, as described above, the destination node fails to recognize the presence of the UE-relay in the cooperative communication environment through the UE-relay, whereby the channel status is not fed back. In other words, the relay node transmits data to the destination node in accordance with the closed-loop mode without information on the channel between the relay node and the destination node. In this case, since the source node cannot measure transmission rate capacity between the UE-relay and the destination node, it may have difficulty in previously determining the transmission rate and designating the determined transmission rate for the relay node.

The present invention suggests a method for obtaining a maximum transmission rate in performing cooperative communication through a UE-relay in a closed-loop environment. In more detail, considering communication outage due to average features of a channel in an open-loop environment between the UE-relay and the destination node, the source node may proactively allocate optimized resources (time resource and/or frequency resource) which will be used for data forwarding from the relay node to the destination node, whereby the relay node may perform transmission/retransmission procedures. Alternatively, the source node may designate a resource which will be used for data transmission/retransmission from the relay node to the destination node, and may notify the relay node of the designated resource before transmission/retransmission is performed.

The bit concatenation based partial signal forwarding scheme, the aforementioned SIC based partial signal forwarding scheme or the other normal partial signal forwarding scheme may be used as the partial signal forwarding scheme through the UE-relay. Although the SIC based partial signal forwarding scheme in the open-loop environment will be described for clarification of the present invention, the present invention is not limited to such SIC based partial signal forwarding scheme, and the same principle suggested in the present invention may be applied to various partial signal forwarding schemes.

Also, according to the partial signal forwarding scheme in the open-loop environment, since communication outage may occur between the relay node and the destination node, transmission/retransmission of the HARQ scheme may be considered for error correction. In the HARQ operation, the destination node may perform error correction by combining data sub-packets in accordance with an incremental redundancy (IR) mode and trying decoding.

Hereinafter, in data transmission/retransmission according to the HARQ scheme in the open-loop environment between the UE-relay and the destination node, a method for designating an optimized resource with a maximum total transmission rate in a source node while controlling a transmission rate based on the probability of communication outage and fulfilling communication outage constraint in accordance with time-variant channel features per transmission phase will be described. In particular, the source node may allocate scheduling information for data forwarding from the relay node to the destination node on the basis of the probability of communication outage, and may allocate, scheduling information for HARQ retransmission if data transmission from the relay node to the destination node is failed. In this case, the scheduling information may include a position and/or quantity of a time and/or frequency resource, a modulation and coding scheme which will be used for transmission/retransmission, etc.

If retransmission scheduling information of the relay node is designated by the source node, and if the destination node transmits NACK to the source node as data decoding is failed, the relay node may overhear the NACK and retransmit the data sub-packets to the destination node in accordance with the retransmission scheduling information designated by the source node. The source node does not perform retransmission for the data which will be transmitted from the relay node to the destination node, even though it receives NACK. If the destination node transmits ACK to the source node as data decoding is successfully performed, the relay node may overhear the ACK. In this case, the relay node does not use the resource for retransmission designated by the source node. If the source node receives the ACK, it may perform new data transmission.

As described above, the scheme for designating the resource, which will be used for transmission/retransmission of the relay node, in the source node may be applied to the case where the relay node is the type-2 relay node (for example, the aforementioned UE-relay).

Figure 11:
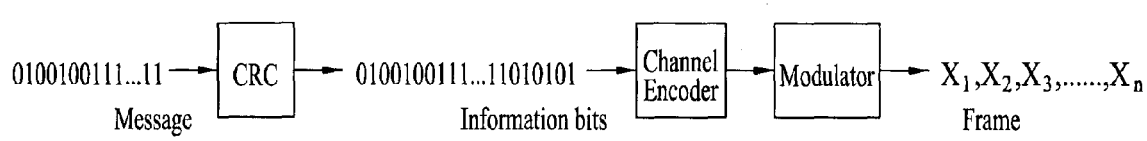
FIG. 11 is a diagram illustrating an example of a signal generated by a base station in accordance with the present invention.

FIG. 11 is a flow chart illustrating an operation of data transmission/retransmission through a relay node in a partial signal forwarding scheme.

At step S1110, the source node S may transmit data to the relay node R and the destination node D.

A part of the data transmitted from the relay node at step S1110 may include data which will be forwarded to the destination node. For example, according to the aforementioned bit concatenation based partial signal forwarding scheme, the data transmitted to the relay node may be encoded data of the data $S_1$ for the relay node and the data $S_{2,2}$ for the destination node in accordance with a bit concatenation mode. Alternatively, according to the aforementioned SIC based partial signal forwarding scheme, the data transmitted to the relay node may be superposition coded data of the basic layer and the superposed layer (b+sc).

For example, the data transmitted to the destination node at the step S1110 may correspond to the data $S_{2,1}$ for the destination node according to the bit concatenation based partial signal forwarding scheme, and may correspond to the superposition coded data of the basic layer and the superposed layer (b+sc) according to the SC based partial signal forwarding scheme.

Also, if the same data are transmitted to the relay node and the destination node at the step S1110, the relay node may overhear the data transmitted from the source node to the destination node. A circle marked with a dotted line at the step S1110 represents that the relay node may overhear the data transmitted from the source node to the destination node. Also, the source node may broadcast the data to the relay node and the destination node. Also, the source node may separately transmit the data to the relay node and the destination node at the step S1110.

At step S1120, the relay node may detect the data, which will be forwarded to the destination node, from the data received at the step S1110. For example, according to the bit concatenation based partial signal forwarding scheme, the relay node may detect the data $S_{2,2}$ for the destination node. Alternatively, according to the SIC based partial signal forwarding scheme, the relay node may detect the superposed layer sc portion.

At step S1130, the destination node may store the data received at the step S1110 in a buffer.

At step S1140, the relay node may forward the data to the destination node. For example, the data forwarded from the relay node to the destination node may correspond to the data $S_{2,2}$ for the destination node according to the bit concatenation based partial signal forwarding scheme, and may correspond to the superposed layer sc according to the SC based partial signal forwarding scheme.

Also, scheduling information for determining a transmission resource, a transmission rate and a modulation scheme, which are used to transmit data from the relay node to the destination node at the step S1140 may previously be designated by the source node. Alternatively, the scheduling information may be transmitted from the source node to the relay node before forwarding operation of the relay node. A method for determining scheduling information, which will be used for data forwarding of the relay node, in the source node will later be described in detail.

At step S1150, the destination node may try data decoding on the basis of the data received from the source node at the step S1110 and the data received from the relay node at the step S1140. For example, according to the bit concatenation based partial signal forwarding scheme, the destination node may perform joint decoding by concatenating the data $S_{2,1}$ received from the source node with the data $S_{2,2}$ forwarded from the relay node, thereby detecting whether its data are received without error. Alternatively, according to the SIC based partial signal forwarding scheme, the destination node may detect the basic layer b by erasing the superposed layer sc received from the relay node, from the superposition coded data (b+sc) of the basic layer and the superposed layer.

As step S1160, if decoding is failed as a result of decoding at the step S1150, the destination node may generate NACK information and transmit the generated NACK information to the source node. If the relay node is the type-2 relay node like the UE-relay, since the destination node cannot recognize the relay node, it cannot transmit the NACK information to the relay node. In this case, the relay node may overhear the NACK information transmitted from the destination node to the source node. A circle marked with a dotted line at the step S1160 represents that the relay node may overhear the NACK information transmitted from the destination node to the source node.

At step S1170, the relay node may retransmit the data to the destination node in accordance with the HARQ mode. In this case, the retransmitted data may be RV transmitted for the data transmitted at the step S1140 in accordance with the IR mode.

Also, scheduling information for determining a transmission resource, a transmission rate and a modulation scheme, which are used to retransmit the data from the relay node to the destination node at the step S1170 may previously be designated by the source node. Alternatively, the scheduling information may be transmitted from the source node to the relay node before retransmission operation of the relay node. A method for determining scheduling information, which will be used for data retransmission of the relay node, in the source node will later be described in detail.

If data decoding of the destination node is successfully performed at the step S1150, step S1180 may be performed directly without the step S1160 and the step S1170.

Alternatively, if decoding is failed even though the destination node uses the data received at the step S1170, the step S1160 and the step S1170 may be performed again.

At the step S1180, if the destination node successfully performs data decoding, it may generate ACK information and transmit the generated ACK information to the source node. If the relay node is the type-2 relay node like the UE-relay, since the destination node cannot recognize the relay node, it cannot transmit the ACK information to the relay node. In this case, the relay node may overhear the ACK information transmitted from the destination node to the source node. A circle marked with a dotted line at the step S1180 represents that the relay node may overhear the ACK information transmitted from the destination node to the source node.

If the relay node receives (overhears) the ACK, the resource allocated for HARQ retransmission from the source node is not used. Meanwhile, if the source node receives the ACK, it may transmit new data to the destination node.

Although ACK/NACK information may be transmitted for the data received by the relay node and the destination node at the step S1110, it has been omitted for clarification of description. In the present invention, it is assumed that data transmission of the step S1110 has been performed without error and that data are received finally without error through HARQ retransmission, etc. even though an error occurs in data transmission of the step S1110.

Figure 12:
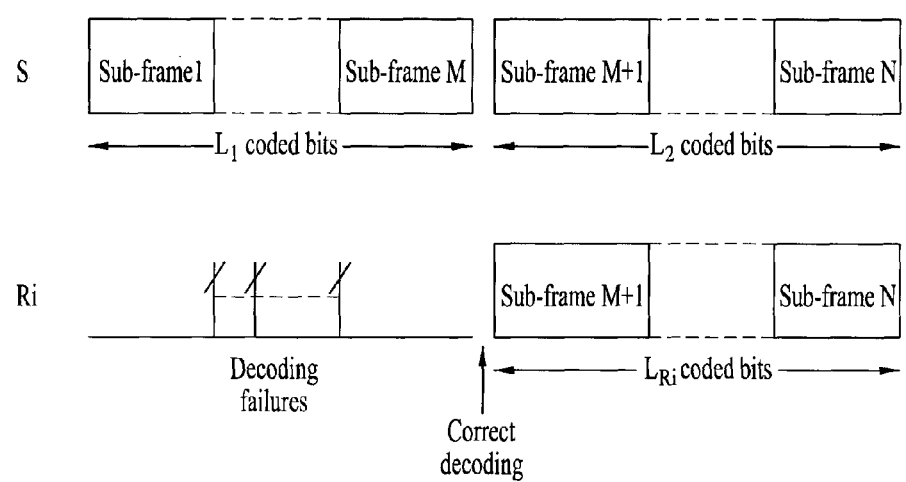
FIG. 12 is a diagram illustrating an example of a frame structure of a signal in accordance with the present invention.

FIG. 12 is a diagram illustrating phases of cooperative communication through a UE-relay. FIG. 12(a) illustrates a broadcasting phase of transmitting a signal from a source node to a relay node and a destination node. FIG. 12(b) illustrates a forwarding phase of forwarding a signal from a relay node to a destination node. FIG. 12(c) illustrates a HARQ operation phase of transmitting decoding result (ACK/NACK) of a signal received by a destination node and performing HARQ retransmission (ReTx) in case of NACK.

Hereinafter, considering the probability of communication of a channel between a relay node and a destination node, a method for determining an optimized resource, a transmission rate and a modulation and coding scheme (MCS), which will be used for transmission/retransmission from the relay node to the destination node, in the source node will be described in more detail. The scheduling information determined by the source node, which will be used for transmission/retransmission from the relay node to the destination node, may be determined previously and then notified to the relay node.

Also, the SIC based partial signal forwarding scheme will be described exemplarily. However, the present invention is not limited to the SIC based partial signal forwarding scheme, and a transmission resource, a transmission rate, etc., which will be used by the relay node, will be determined by the source node in accordance with a similar principle of the other partial signal forwarding scheme.

First of all, at the broadcasting phase of FIG. 12(a), the source node may generate data X, which will be transmitted, by superposition coding a basic layer $x_b$ and a superposed layer $x_{sc}$ as expressed by the following Equation 23.

$$X = (1-\alpha)x_b + \alpha x_{sc} \text{ where } \alpha = \left(\frac{1}{\gamma_{sd}} - \frac{1}{\gamma_{sr}}\right) 0 \leq \alpha \leq 1 \quad \text{[Equation 23]}$$

$$R_b = \min\left[\log(1+(1-\alpha)\gamma_{sd}), \log\left(1+\frac{(1-\alpha)\gamma_{sr}}{1+\alpha\gamma_{sr}}\right)\right]$$

$$R_s = \log(1+\alpha\gamma_{sr})$$

$$R_2 = \log(1+\gamma_{rd})$$

$$R_{tot} = \frac{R_b + R_s}{1 + R_s/R_2}$$

In the above Equation 23, $\alpha$ means a ratio of the basic layer $x_b$ and the superposed layer $x_{sc}$, and $(1-\alpha)$ is allocated to the basic layer $x_b$ and $\alpha$ is allocated to the superposed layer $x_{sc}$. $\gamma_{sd}$ is SNR for a channel between the source node S and the destination node D, $\gamma_{sr}$ is SNR for a channel between the relay node R and the destination node D, and $\gamma_{rd}$ is SNR for a channel between the relay node R and the destination node D. $R_b$ is a transmission rate of the basic layer b, $R_s$ is a transmission rate of the superposed layer sc, and $R_2$ is a transmission rate between the relay node and the destination node.

At the forwarding phase of FIG. 12(b), the relay node may extract data (for example, superposed layer $x_{sc}$) which will be forwarded to the destination node, by decoding the signal received (or overheard) from the source node, and may forward the extracted data to the destination node.

In this case, since it is assumed that the channel between the relay node and the destination node is in the open-loop environment, a resource (time resource and/or frequency resource) which will be used by the relay node to transmit data to the destination node may previously be allocated by the source node. For example, the time resource $T_2$ which will be used by the relay node for transmission to the destination node is previously determined by the source node. Since the source node does not know the channel status exactly, it may determine an optimized resource on the basis of the probability of communication outage by using average channel information between the relay node and the destination node.

The following Equation 24 represents the probability of communication outage that may occur at the forwarding phase of FIG. 12(b).

$$P_{out(2)} = Pr[R_2 < R_s/T_2] \leq \delta_2 \quad \text{[Equation 24]}$$

$$= 1 - \exp[-(2^{R_s/T_2}-1)/SNR_{RD}] \leq \delta_2$$

In the above Equation 24, $R_2$ and $R_s$ are the same as defined in the Equation 23. According to the Equation 24, the probability $P_{out(2)}$ of communication outage based on the time resource $T_2$ which will be used by the relay node for transmission to the destination node may be defined on the basis of information $R_s$ per unit hour, which should be forwarded from the relay node. $\delta_2$ is a reference value of the probability of communication outage, which determines whether communication outage occurs at the forwarding phase of FIG. 12(b), and $SNR_{RD}$ means average SNR information between the relay node and the destination node. The Equation 24 may be arranged for the $T_2$, whereby the following Equation 25 may be obtained.

$$T_2 \geq \frac{R_s}{\log_2[1 - SNR_{RD}\ln(1-\delta_2)]} \quad \text{[Equation 25]}$$

A transmission rate $\overline{R}_2$ of a signal which will be transmitted from the relay node to the destination node at the forwarding phase of FIG. 12(b) based on the Equation 25 may be determined as expressed by the following Equation 26.

$$\overline{R}_2 \triangleq R_s/T_2 \leq \log_2[1-SNR_{RD}\ln(1-\delta_2)] \quad \text{[Equation 26]}$$

As illustrated in the HARQ operation phase of FIG. 12(c), due to error occurring in the signal transmitted from the relay node to the destination node for the time resource of $T_2$ determined as above, if the destination node transmits NACK and the relay node overhears the NACK, the relay node performs retransmission. At this time, the resource used by the relay node to retransmit data may previously be determined by the source node.

It is assumed that the channel condition between the relay node and the destination node at the forwarding phase of FIG. 12(b) is the same as that at the HARQ operation phase of FIG. 12(c). In other words, it is assumed that the channel between the relay node and the destination node is a quasi-static channel. A time resource $T_3$ used for retransmission of the relay in accordance with the above assumption may be determined as expressed by the following Equations 27 and 28. The following Equation 27 illustrates the probability of communication outage during HARQ retransmission of the HARQ operation phase of 12(c).

$$P_{out(3)} = Pr[R_2 < R_s/(T_2+T_3) \mid R_2 < R_s/T_2] \leq \delta_3 \quad \text{[Equation 27]}$$

$$= \frac{1}{\delta_2}Pr[R_2 < R_s/(T_2+T_3)] \leq \delta_3$$

According to the Equation 27, based on the probability of communication outage at the forwarding phase of FIG. 12(b), the probability $P_{out(3)}$ of communication outage may be defined on the basis of information $R_s$ per unit hour, which should be forwarded from the relay node in accordance with the time resource $T_3$ which will be used by the relay node for HARQ retransmission to the destination node. $\delta_3$ is a reference value of the probability of communication outage, which determines whether communication outage occurs at the HARQ retransmission phase of FIG. 12(c). The Equation 27 may be arranged for the $T_3$, whereby the following Equation 28 may be obtained.

$$T_3 \geq R_s\left[\frac{1}{\log_2[1-SNR_{RD}\ln(1-\delta_2\delta_3)]} - \frac{1}{\overline{R}_2}\right] \quad \text{[Equation 28]}$$

A transmission rate $\overline{R}_3$ of a signal which will be transmitted from the relay node to the destination node at the HARQ retransmission phase of FIG. 12(c) based on the Equation 28 may be determined as expressed by the following Equation 29.

$$\overline{R}_3 \Delta R_s/(T_2+T_3) \leq \log_2[1-\text{SNR}_{RD}\ln(1-\delta_2\delta_3)] \qquad \text{[Equation 29]}$$

In the HARQ operation phase of FIG. 12(c), extra data from the data transmitted from the relay node to the destination node at the forwarding phase of FIG. 12(b) are only transmitted, and the IR based HARQ operation may be used such that decoding is performed based on the total data accumulated in the destination node.

The time resources (i.e., $T_2$ and $T_3$) which will be used for transmission and retransmission from the relay node to the destination node may be determined as optimized values by the source node. In this case, determining the optimized values for $T_2$ and $T_3$ may mean selecting the total transmission rate $R_{tot}$ as a maximum value. This may be expressed by the following Equation 30.

$$\max_{T_2,T_3} R_{tot} = \frac{R_b+R_s}{1+T_2}(1-P_{out(2)}) + \frac{R_b+R_s}{1+T_2+T_3}P_{out(2)}(1-P_{out(3)}) \qquad \text{[Equation 30]}$$

As expressed in the Equation 30, if $T_2$ and $T_3$ are increased, the probability of communication outage is reduced but loss may occur in the total transmission rate. Accordingly, the optimized $T_2$ and $T_3$ are estimated by the Equation 30, whereby an optimized time resource that may obtain a maximum average transmission rate may be allocated.

As described above, if it is difficult to estimate exact information of the channel between the relay node and the destination node (that is, if the type-2 relay node such as UE-relay is used), the source node may previously determine scheduling information on transmission from the relay node to the destination node and notify the relay node of the determined scheduling information when the source node forwards data to the destination node through the relay node in accordance with the partial signal forwarding scheme. As a result, even in the open-loop environment where exact information on the channel between the relay node and the destination node is not given, the optimized time resource may be allocated using probability property. Although the time resource is allocated to the relay node in the aforementioned embodiment, it will be apparent that the same principle described in the present invention may be applied to the case where a frequency resource is allocated in accordance with the probability of communication outage. As described above, the source node schedules the resource, which will be used for transmission/retransmission from the relay node to the destination node, the transmission rate, etc. on the basis of the probability of communication outage, whereby limitation in the case where the channel information between the relay node and the destination node cannot be obtained may be overcome effectively.

In the mean time, if the source node S transmits a signal to the destination node D by using the UE-relay R, a problem occurs in that the destination node D may receive re-encoded messages from a plurality of user equipment relay nodes R at the transmission time that cannot be recognized previously.

Also, a problem as to how the destination node D applies individual timing and code information for decoding the messages received from the plurality of user equipment relay nodes R and the source node S may occur.

Accordingly, the present invention is intended to solve the above problems through a modified dynamic DF (M-DDF) that uses a random codeset based on rateless codes.

Mapping of the user equipment relay node R in the modified dynamic DF (M-DDF) is varied depending on the individual transmission time. In other words, if the user equipment relay node R successfully receives a signal from the source node S regardless of rate in an environment where rateless codes are used, it may transmit signals received from next subframe to the destination node D.

Prior to detailed description of the present invention, the rateless codes applied to the modified dynamic DF (M-DDF) will be described in detail with reference to FIG. 11 and FIG. 12.

Referring to FIG. 11, the message transmitted from the source node S in the present invention is configured by K information. At this time, the K information includes cyclic redundancy check (CRC) bits used to check whether the messages received by the destination node have been exactly decoded.

Also, K information bits are encoded by the rateless code. Afterwards, the encoded signals are modulated by a modulator, and a certain number of code symbols $\{X_n\}$ for forming codeword, that is, frame are generated.

In the mean time, the generated frame, as shown in FIG. 12, may be partitioned by concatenated subframes.

Referring to FIG. 12, the user equipment relay node R performs decoding for the received messages only after receiving each subframe.

At this time, since the signals received by the user equipment relay node R have been encoded by the rateless code, they may be forwarded to the destination node D regardless of the rate. In other words, after the user equipment relay node R receives the Mth subframes, if messages are decoded exactly, the user equipment relay node R may again encode K-bit message by using a previously set rateless code $C_M$ (code mapping method) and then may transmit the corresponding messages to the destination node D.

If the source node S, the user equipment relay node R and the destination node D share information on code (or code mapping) used in the environment where rateless codes are used, the destination node D may perform the signal transmission procedure more efficiently and complete the signal transmission procedure quickly.

In this specification, the following is assumed for convenience of description. However, it will be apparent to those skilled in the art that the following assumption is only exemplary and other assumptions may be applied to the present invention.

First of all, the source node S, the user equipment relay node R and the destination node D use a single antenna, and all the user equipment relay nodes R are operated in a half-duplex mode of two phases of the transmission process.

At the first phase (listening phase), the source node S broadcasts a message, and the user equipment relay node R and the destination node D receive the broadcasted message.

If the user equipment relay node R successfully performs decoding prior to the destination node D, the source node S and the user equipment relay node R start to transmit the message to the destination node D at the second phase (collaboration phase).

Also, it is assumed that orthogonal resources may be used for S-D and R-D channels.

In the meantime, the present invention may support both CDMA and OFDM for orthogonal resource allocation.

For example, in case of a CDMA based system, orthogonal spreading code allocated to the source node S and the user equipment relay node R may be used, whereby the destination node D may identify each transmitting entity.

Also, in case of an OFDM based system, scheduling and allocating orthogonal channels (orthogonal channels) allocated to the source node S and the user equipment relay node R may be used, whereby the destination node D may identify each transmitting entity.

Accordingly, the source node S and the user equipment relay node R may perform signal transmission in the CDMA and OFDM based system by using the aforementioned spreading codes or orthogonal channels.

Also, it is assumed that the user equipment relay node R is designed to perform decoding for the messages received sequentially after receiving each subframe.

In other words, since S-R link quality associated with the plurality of user equipment relay nodes R is independent statistically, it is considered that exact message decoding at the user equipment relay node R may randomly occur in a random subframe unit.

Also, in case of M<N, it is assumed that N subframes exist within one frame and the i-th user equipment relay node R exactly performs decoding after receiving M sub-frames.

At this time, the source node S (S) transmits the number $L_1$ and $L_2$ of code symbols for the first phase and the second phase. On the other hand, $L_{Ri}$ code symbols are transmitted by the i-th user equipment relay node R illustrated in FIG. 12.

Also, lengths of $L_1$ and $L_2$ may be changed depending on the channel status between the source node S and the user equipment relay node R. Full diversity may occur only if $L_2$ is greater than transmitted information.

Figure 13:
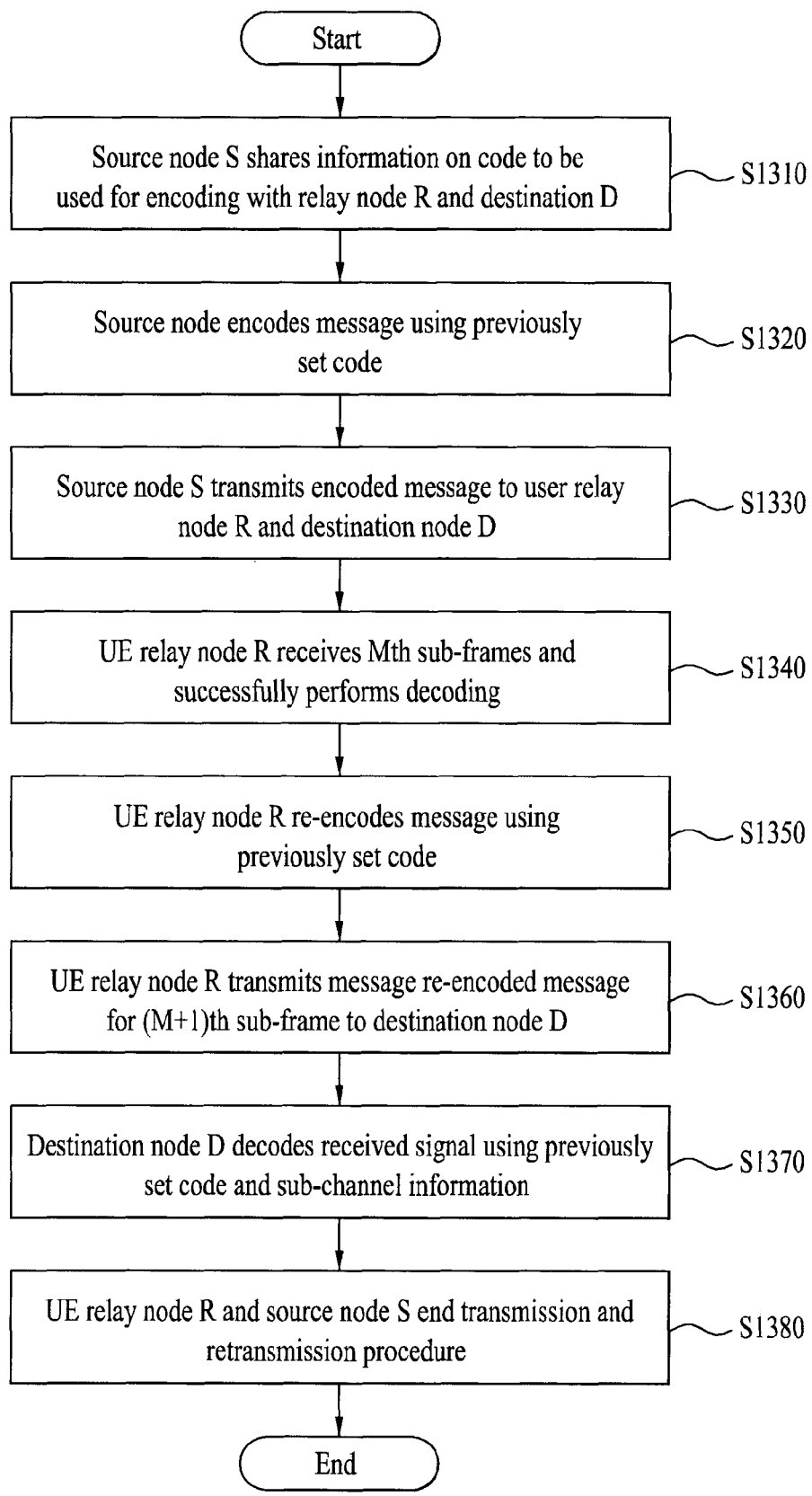
FIG. 13 is a flow chart illustrating an example of transmitting data from a base station to a user equipment by using a previously set rule and a relay node in accordance with the present invention.

Hereinafter, the detailed embodiment of the present invention will be described with reference to FIG. 13.

First of all, the source node S may share information on a code, which will be used for a signal, with the user equipment relay node R and the destination node D (S1310).

Hereinafter, code mapping schemes that may be shared through the step S1310 will be described.

(1) In-Phase Random Code/Channel Mapping Mode

In the in-phase random code/channel mapping mode, the user equipment relay node R that has successfully performed decoding for the M-th subframe transmits data from the M+1-th sub-frame to the destination node D using the same codes and channels as the source node S for each subframe.

(2) Fixed Random Code/Channel Mapping Mode

In the fixed random code/channel mapping mode, the user relay node R that has successfully performed decoding for the M-th subframe transmits data finally detected among the codes and channels used for each subframe by the source node S, from the M+1-th sub-frame to the destination node D (transmits data from the M+1-th subframe to the destination node D by using the code and channel that were used for the detection of the signal from the source node S at the latest subframe (i.e., the M-th subframe)).

(3) Delayed Random Code/Channel Mapping Mode

In the delayed random code/channel mapping mode, the user equipment relay node R that has successfully performed decoding for the M-th subframe transmits initial data among the codes and channels used for each subframe by the source node S, from the M+1-th sub-frame to the destination node D (transmits data from the M+1-th subframe to the destination node D in the order of code and channel initially used by the source node S among the codes and channels used for each subframe by the source node S).

In the meantime, in the OFDM based system, the user equipment relay node R may transmit ACK signal to the destination node, wherein the ACK signal indicates decoding success. Also, the ACK signal may be transmitted to the destination node through the source node S.

The destination node that has received the ACK signal may perform decoding for the received signal in accordance with a rule which is shared.

Accordingly, the user equipment relay node R transmits data to the destination node D in accordance with the aforementioned in-phase random code/channel mapping mode, fixed random code/channel mapping mode and delayed random code/channel mapping mode, and the rule may be shared among the source node S, the user equipment relay node R and the destination node D through the step S1310.

However, the aforementioned in-phase random code/channel mapping mode, fixed random code/channel mapping mode and delayed random code/channel mapping mode are only examples to which the present invention may be applied, and it will be apparent that various mapping modes may be used.

Next, the source node S performs encoding for the messages by using codes which are previously set (S1320).

In other words, the source node S encodes the messages by using different codes (for example, rateless codes) {C0, C1, C2 . . . } which are previously set. At this time, the message may be configured by an information bit K having CRC bits.

Information as to what code is used for encoding for each subframe may be shared among the source node S, the user equipment relay node R and the destination node D through the step S1310.

Next, the source node S transmits the encoded messages to the user equipment relay node R and the destination node D (S1330).

The step S1330 may be applied to both the CDMA based system or the OFDM based system as described above.

In other words, for the CDMA based system, the source node S may use previously set sequences of different spreading codes for each subframe transmission. Also, for the OFDM based system, the source node S may use previously set sequences for different orthogonal channels.

Afterwards, after the i-th user equipment relay node R of the plurality of user equipment relay nodes receives the M th sub-frames, the messages may be decoded exactly (S1340).

Also, the user equipment relay node R again encodes the K-bit message by using the rateless code $C_M$ (code mapping method) which is previously set (S1350).

In other words, the i-th user equipment relay node R does not transmit a signal for the listening phase (for example, the status where exact decoding is not performed).

However, if the message is exactly decoded (if decoding is successfully performed) after the i-th user equipment relay node R receives the M th sub-frames, the user equipment relay node R again encodes the K-bit message by using the rateless code $C_M$ (code mapping method) which is previously set.

Next, the i-th user equipment relay node R transmits the re-encoded message to the destination node for the (M+1)-th sub-frame (S1360).

In other words, the i-th user equipment relay node R may transmit the re-encoded message to the destination node in accordance with any one of the in-phase random code/ channel mapping mode, fixed random code/channel mapping mode and delayed random code/channel mapping mode, and in accordance with the rule shared at the step S1310.

If the user equipment relay node R uses a specific orthogonal sub-channel associated with the rateless code $C_M$ (code mapping method), the destination node D is likely to combine energy and information on the basis of a selected code mapping scheme of code mapping schemes which will be described later.

Also, the sub-channel may be expressed by distinctive frequency, time and/or code indices, or their combination.

Afterwards, the destination node D may decode the received signal by using code and sub-channel information (code mapping method) which is previously set (S1370).

At this time, the destination node D may perform decoding for the received signal in accordance with various modes, which will be described in more detail.

(1) Direct (DT) Mode

This DT mode means a decoding mode that the number of user equipment relay nodes R activated in respect of each previous subframe is 0 and the number of user equipment relay nodes R activated in respect of each current subframe is 0. In other words, this DT mode means a decoding mode used when a signal is received from the source node S only.

(2) Energy Combining (EC) Mode

This EC mode means a decoding mode that the number of user equipment relay nodes R activated in respect of each previous subframe is 0 and the number of user equipment relay nodes R activated in respect of each current subframe is not 0. In other words, although signals are received from at least one user equipment relay node R in addition to the source node S, the received signals are the same as each other.

(3) Information Combining (IC) Mode

This IC mode means a decoding mode that the number of user equipment relay nodes R activated in respect of each previous subframe is 0 and the number of user equipment relay nodes R activated in respect of each current subframe is 0. In other words, signals are received from the other user equipment relay node R in addition to the source node S, and the signal received from the source node S and the signal received from the user equipment relay node R are not repeated with each other.

(4) Mixed Combining (MC) Mode

This MC mode means a decoding mode that the number of user equipment relay nodes R activated in respect of each previous subframe is 1 and the number of user equipment relay nodes R activated in respect of each current subframe is 0. In other words, signals are received from the other user equipment relay node R in addition to the source node S, and the signal received from the source node S and the signal received from the user equipment relay node R may be repeated with each other.

However, the aforementioned Direct (DT) mode, Energy Combining (EC) mode, Information Combining (IC) mode and Mixed Combining (MC) mode are only exemplary, and the present invention is not limited to such modes.

The aforementioned decoding modes will be described in more detail with reference to FIG. 14.

Figure 14:
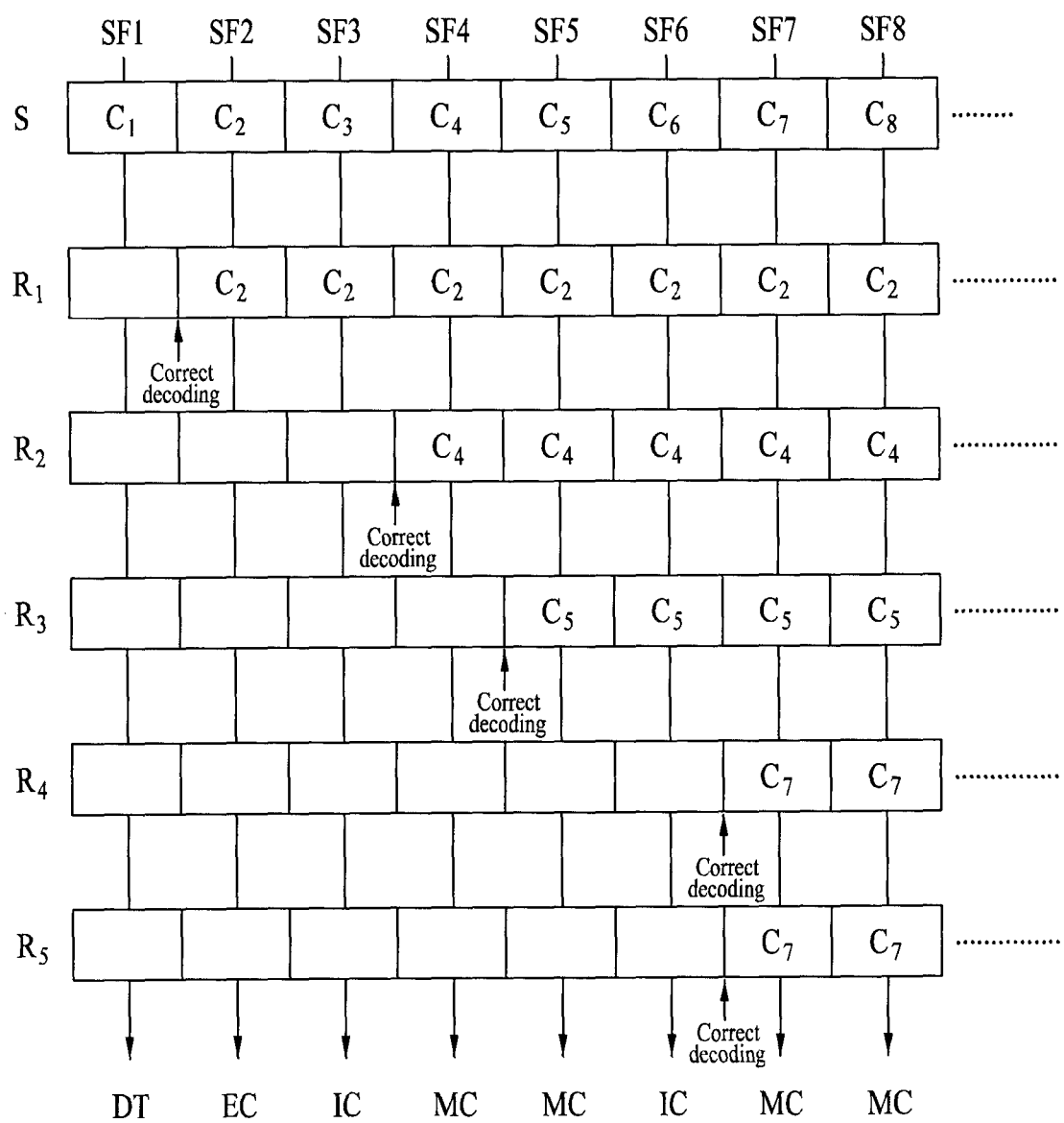
FIG. 14 is a diagram illustrating an example of a decoding method of a user equipment in accordance with the present invention.

Referring to FIG. 14, only one data received from the source node S exists in the DT mode.

Next, although data are received from the user equipment relay node R in addition to the source node S in the EC mode, the received data are the same as each other.

Also, in the IC mode, data are received from the user equipment relay node R in addition to the source node S, and the received data are different from each other and are not repeated with each other.

Also, in the EC mode, data are received from the user equipment relay node R in addition to the source node S, and the received data may be repeated with each other.

Accordingly, the destination node performs DT, EC, IC, or MC combining on the basis of the applied code mapping schemes at the step S1370.

For example, if the user equipment relay node R uses the same sub-channel as that of the source node S, all the transmission attributes of the user equipment relay node R, such as modulation, scheme, scrambling sequence, and reference signal type, are the same as those of the source node S.

Accordingly, the source node S may previously notify the user equipment relay node R of the attributes. For example, the source node S may previously notify the user equipment relay node R of the attributes in such a manner that transmission attributes used for sub-frame 1 are set to transmission attributes of sub-frames 2, 3, . . . , N.

Also, the source node S may change attributes of subsequent sub-frames by using a previously set rule (for example, code mapping schemes). For example, a sub-channel index of each subframe may be changed in accordance with the previously set order based on frequency or time diversity. Accordingly, the destination node D may not need to know whether the user equipment relay node R has joined in transmission.

In the mean time, in the EC mode of the CDMA based system, different propagation delays between the S-D channels and the R-D channels may occur. Accordingly, the destination node D may perform decoding, whereby maximum rate combining of the source and relay signals may be used.

Also, if the IC mode is used, since different spreading codes may be used, the destination node D may perform decoding through information combining between the source and relay signals, and between S-D and R-D links.

Also, in the OFDM based system, difference occurs in the EC mode only. In this case, the destination node D may perform decoding by performing joint detection for superpositioned source and relays instead of joint decoding.

Afterwards, the user equipment relay node R and the source node S end the transmission and retransmission process (S1380).

In other words, if the destination node D successfully performs decoding, the destination node D notifies the source node S of the decoding success. At this time, the user equipment relay node R may receive this information from the source node S.

Accordingly, the user equipment relay node R and the source node S end the transmission and retransmission procedure, respectively.

Hereinafter, the detailed embodiment of the aforementioned present invention will be described.

Figure 15:
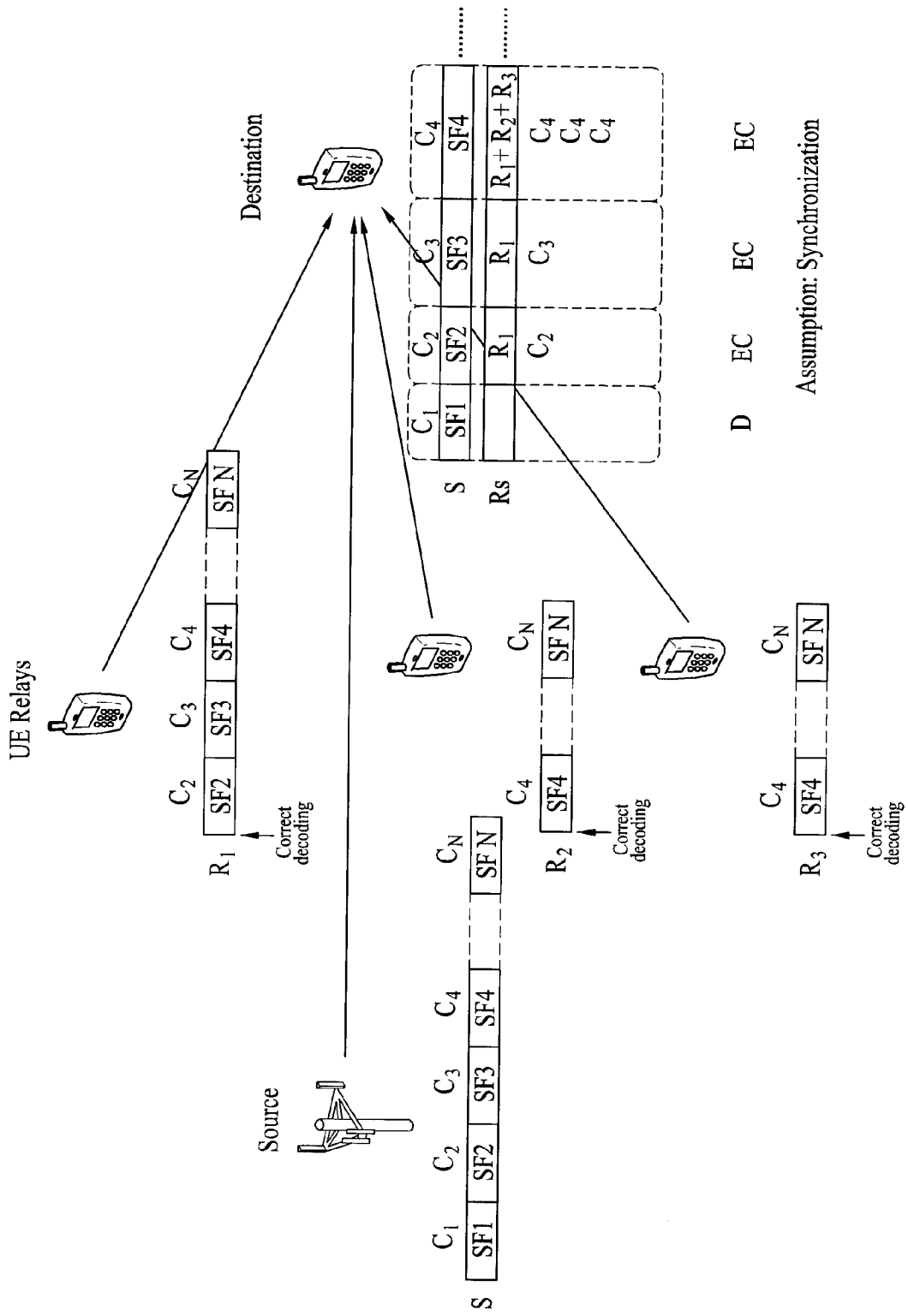
FIG. 15 is a diagram illustrating an example of in-Phase random codeset and joint/sequential decoding in accordance with the present invention.

FIG. 15 is a diagram illustrating an example of an in-phase random code/channel mapping mode in accordance with the present invention.

First of all, it is assumed that the source node S, the user equipment relay node R and the destination node D share information as to application of an in-phase random code/channel mapping mode.

The source node S transmits {C0, C1, C2 . . . CN} to the user equipment relay node R and the destination node D.

In FIG. 15, the first user equipment relay node R1 has successfully performed correct decoding for the first subframe of code C1. Accordingly, the first user equipment relay node R1 sequentially transmits subsequent {C2 . . . CN} to the destination node D in accordance with the in-phase random code/channel mapping mode.

Also, in FIG. 15, the second user equipment relay node R2 has successfully performed correct decoding for the third subframe of code C3. Accordingly, the second user equipment relay node R2 sequentially transmits subsequent {C4 . . . CN} to the destination node D in accordance with the in-phase random code/channel mapping mode.

Also, in FIG. 15, the third user equipment relay node R3 has successfully performed correct decoding for the third subframe of code C3. Accordingly, the third user equipment relay node R3 sequentially transmits subsequent {C4 . . . CN} to the destination node D in accordance with the in-phase random code/channel mapping mode.

In the meantime, the destination node D may perform decoding by applying the DT mode and the EC mode to the received signal.

Afterwards, if decoding is completely performed, the destination node D may notify the source node S of the completed decoding, and the user equipment relay node R and the source node S end the transmission and retransmission procedure.

Figure 16:
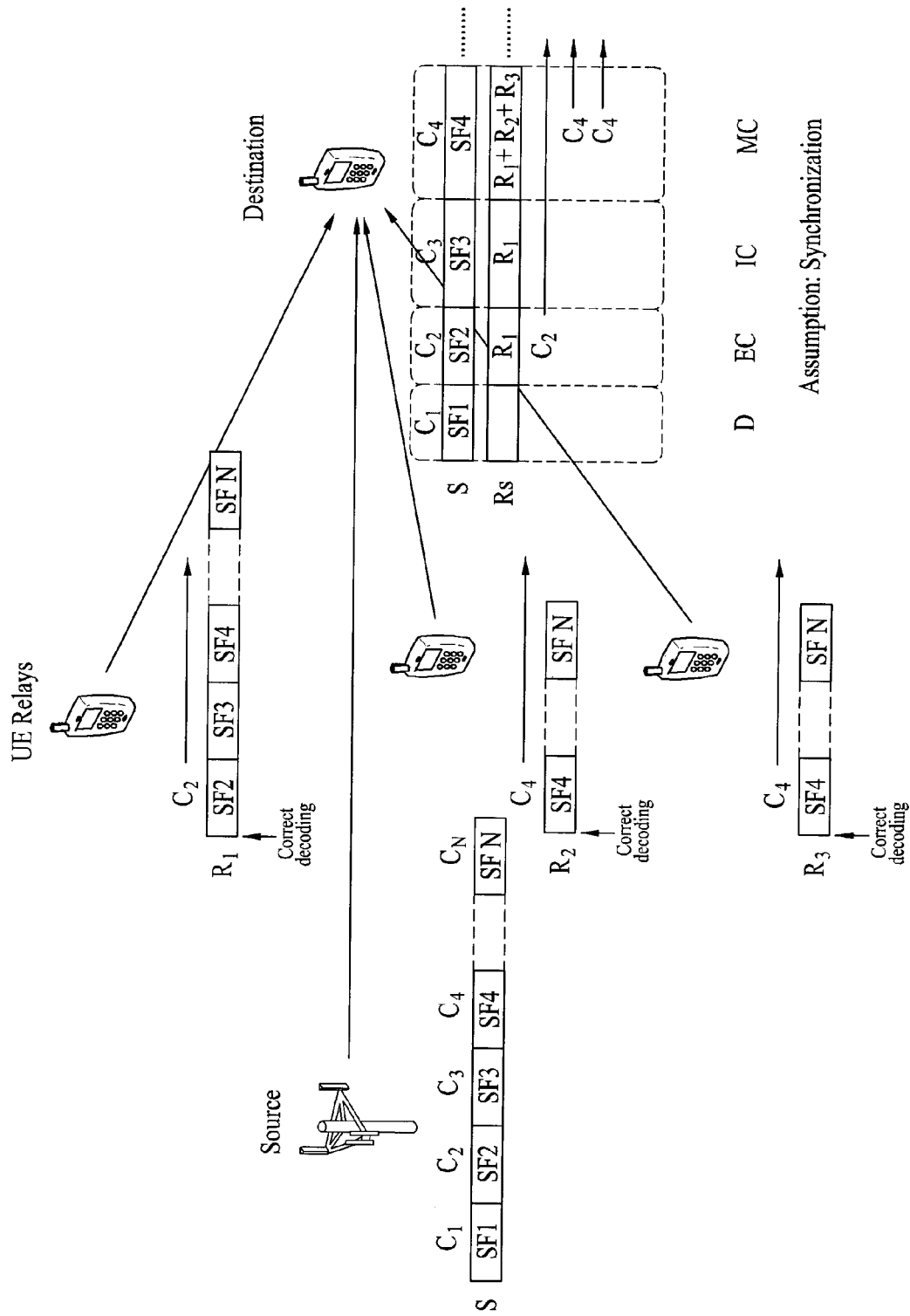
FIG. 16 is a diagram illustrating an example of fixed random codeset and joint/sequential decoding in accordance with the present invention.

FIG. 16 is a diagram illustrating an example of a fixed random code/channel mapping mode in accordance with the present invention.

First of all, it is assumed that the source node S, the user equipment relay node R and the destination node D share information as to application of a fixed random code/channel mapping mode.

The source node S transmits {C0, C1, C2 . . . CN} to the user equipment relay node R and the destination node D.

In FIG. 16, the first user equipment relay node R1 has successfully performed correct decoding for the first subframe of code C1. Accordingly, the first user equipment relay node R1 transmits a subsequent code C2 to the destination node D by repeatedly using the code C2 in accordance with the fixed random code/channel mapping mode.

Also, in FIG. 16, the second user equipment relay node R2 has successfully performed correct decoding for the third subframe of code C3. Accordingly, the second user equipment relay node R2 transmits a subsequent code C4 to the destination node D by repeatedly using the code C4 in accordance with the fixed random code/channel mapping mode.

Also, in FIG. 16, the third user equipment relay node R3 has successfully performed correct decoding for the third subframe of code C3. Accordingly, the third user equipment relay node R3 transmits a subsequent code C4 to the destination node D by repeatedly using the code C4 in accordance with the fixed random code/channel mapping mode.

In the meantime, the destination node D may perform decoding by applying the direct (DT) mode, the energy combining (EC) mode, the information combining (IC) mode and the mixed combining (MC) mode to the received signal.

Afterwards, if decoding is completely performed, the destination node D may notify the source node S of the completed decoding, and the user equipment relay node R and the source node S end the transmission and retransmission procedure.

Figure 17:
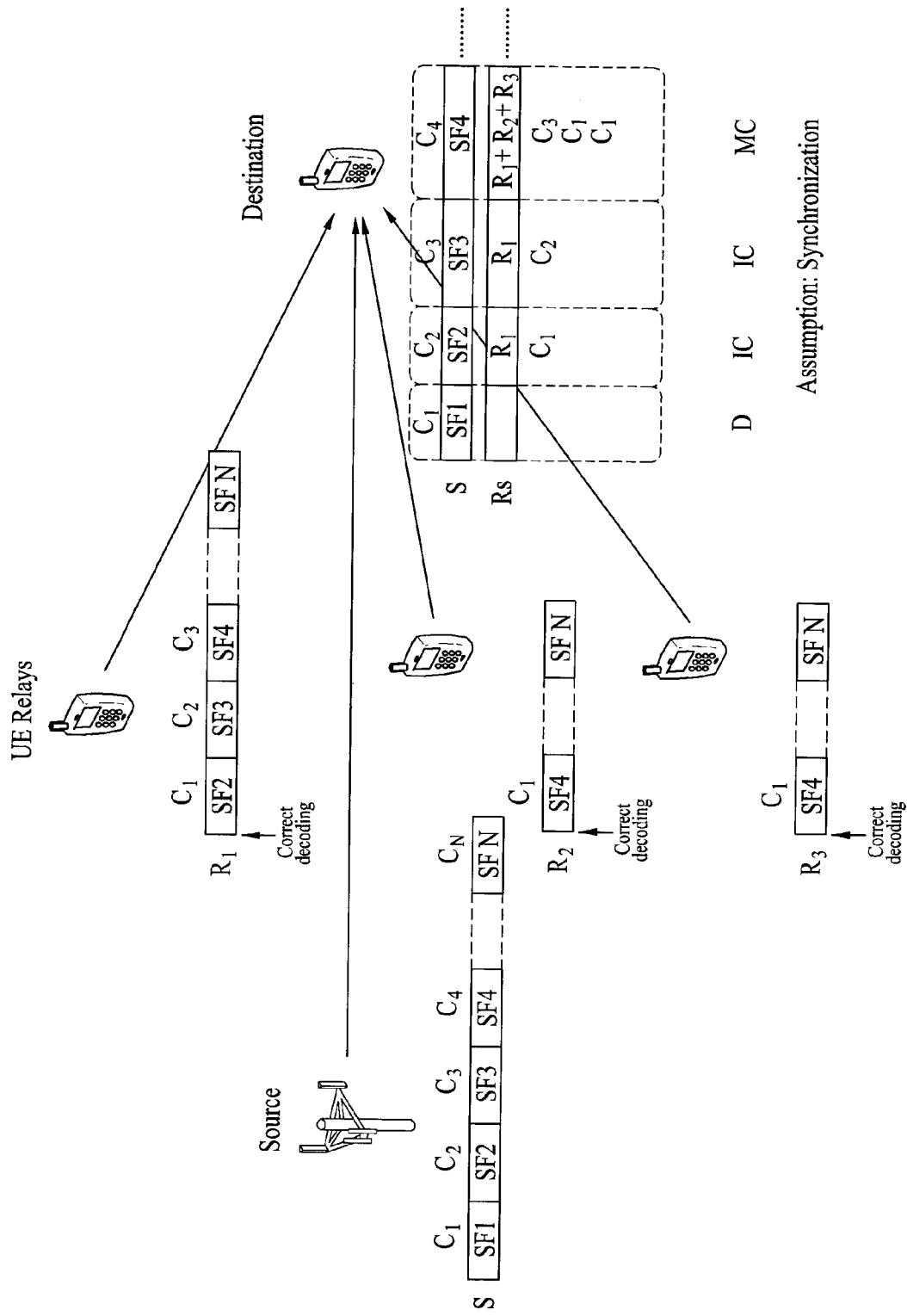
FIG. 17 is a diagram illustrating an example of delayed random codeset and joint/sequential decoding in accordance with the present invention.

FIG. 17 is a diagram illustrating an example of a delayed random code/channel mapping mode in accordance with the present invention.

First of all, it is assumed that the source node S, the user equipment relay node R and the destination node D share information as to application of a delayed random code/channel mapping mode.

The source node S transmits {C0, C1, C2 . . . CN} to the user equipment relay node R and the destination node D.

In FIG. 17, the first user equipment relay node R1 has successfully performed correct decoding for the first subframe of code C1. Accordingly, the first user equipment relay node R1 repeatedly transmits the code C1 initially detected to the destination node D in the order of the code initially used by the source node in accordance with the delayed random code/channel mapping mode.

Also, in FIG. 17, the second user equipment relay node R2 has successfully performed correct decoding for the third subframe of code C3. Accordingly, the second user equipment relay node R2 repeatedly transmits the code C1 initially detected to the destination node D in the order of the code initially used by the source node in accordance with the delayed random code/channel mapping mode.

Also, in FIG. 17, the third user equipment relay node R3 has successfully performed correct decoding for the third subframe of code C3. Accordingly, the third user equipment relay node R3 repeatedly transmits the code C1 initially detected to the destination node D in the order of the code initially used by the source node in accordance with the delayed random code/channel mapping mode.

In the meantime, the destination node D may perform decoding by applying the direct (DT) mode, the energy combining (EC) mode, the information combining (IC) mode and the mixed combining (MC) mode to the received signal.

Afterwards, if decoding is completely performed, the destination node D. may notify the source node S of the completed decoding, and the user equipment relay node R and the source node S end the transmission and retransmission procedure.

Figure 18:
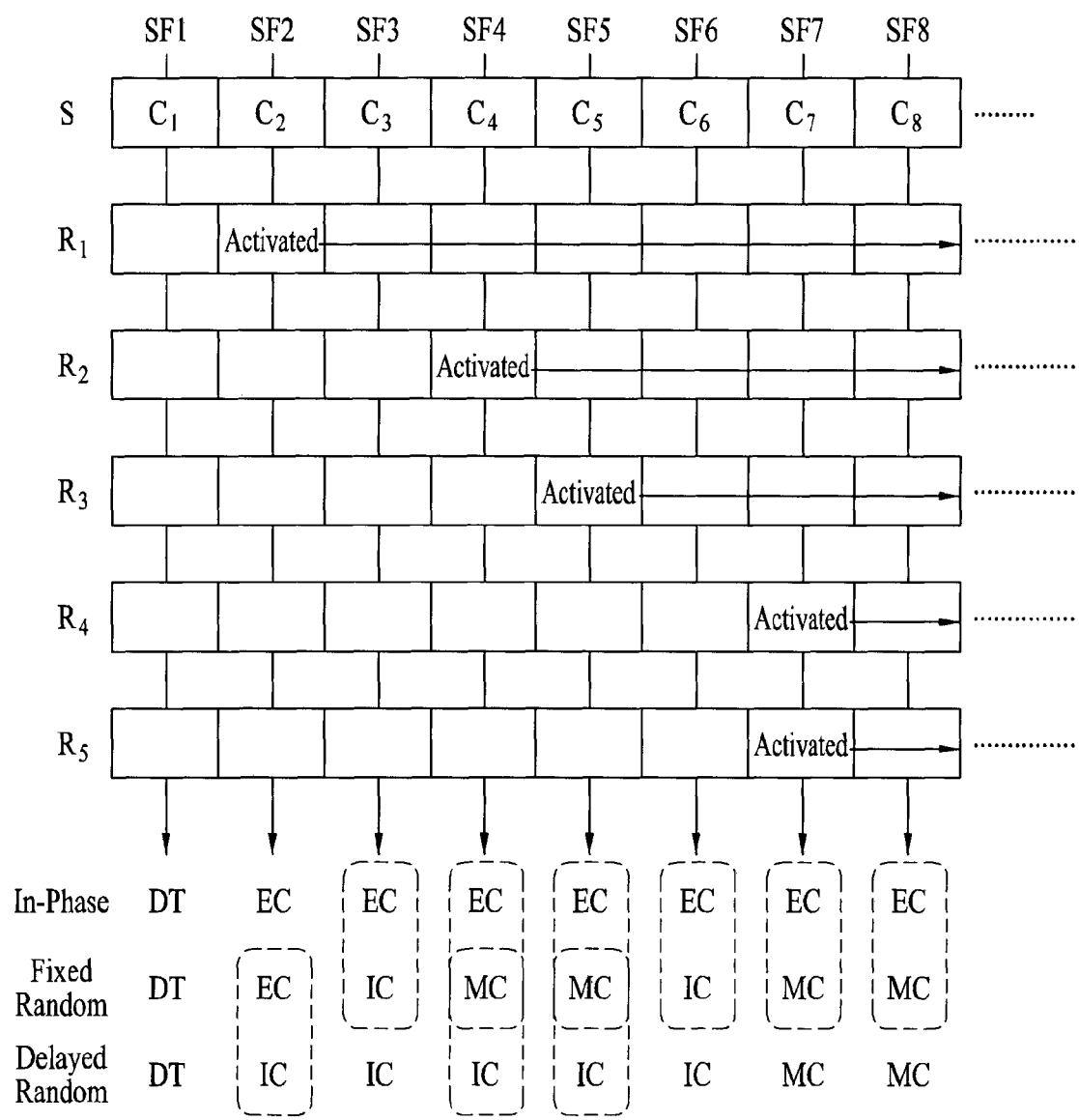
FIG. 18 is a diagram illustrating an example of Combining Results Comparisons for In-Phase, Fixed and Delayed random code mapping in accordance with the present invention.

Also, FIG. 18 is a diagram illustrating an example of Combining Results Comparisons for the aforementioned DT, EC, IC and MC modes in accordance with the present invention.

In the meantime, if all the user equipment relay nodes R perform a relay function, it may cause degradation of system performance.

Accordingly, the present invention provides a method for determining R-D link status by using a reference signal received by the user equipment relay node R from the destination node D together with ACK/NACK and designating the user equipment relay node R, which will perform a relay function, in the source node S on the basis of the determined R-D link status.

For example, if ACK/NACK transmission from the destination node D to the source node S is performed through the user equipment relay node R, it may mean that the R-D link channel status is good.

Accordingly, the present invention provides a method for allowing a user equipment relay node R having a relatively better R-D link quality among a plurality of user equipment relay nodes R to perform exact decoding for a message by using ACK/NACK signal and transmit the decoded message to the destination node D.

In the meantime, in addition to the ACK/NACK signal of the destination node D, ACK/NACK signal of the user equipment relay node R may be used for more exact determination.

In other words, the source node S may select a user equipment relay node R having better R-D link quality by using a condition as to whether the source node S has received from the user equipment relay node R the ACK/NACK signal for data directly transmitted to the user equipment relay node R in addition to a condition as to whether the source node S has received the ACK/NACK signal of the destination node D through the user equipment relay node R.

Figure 19:
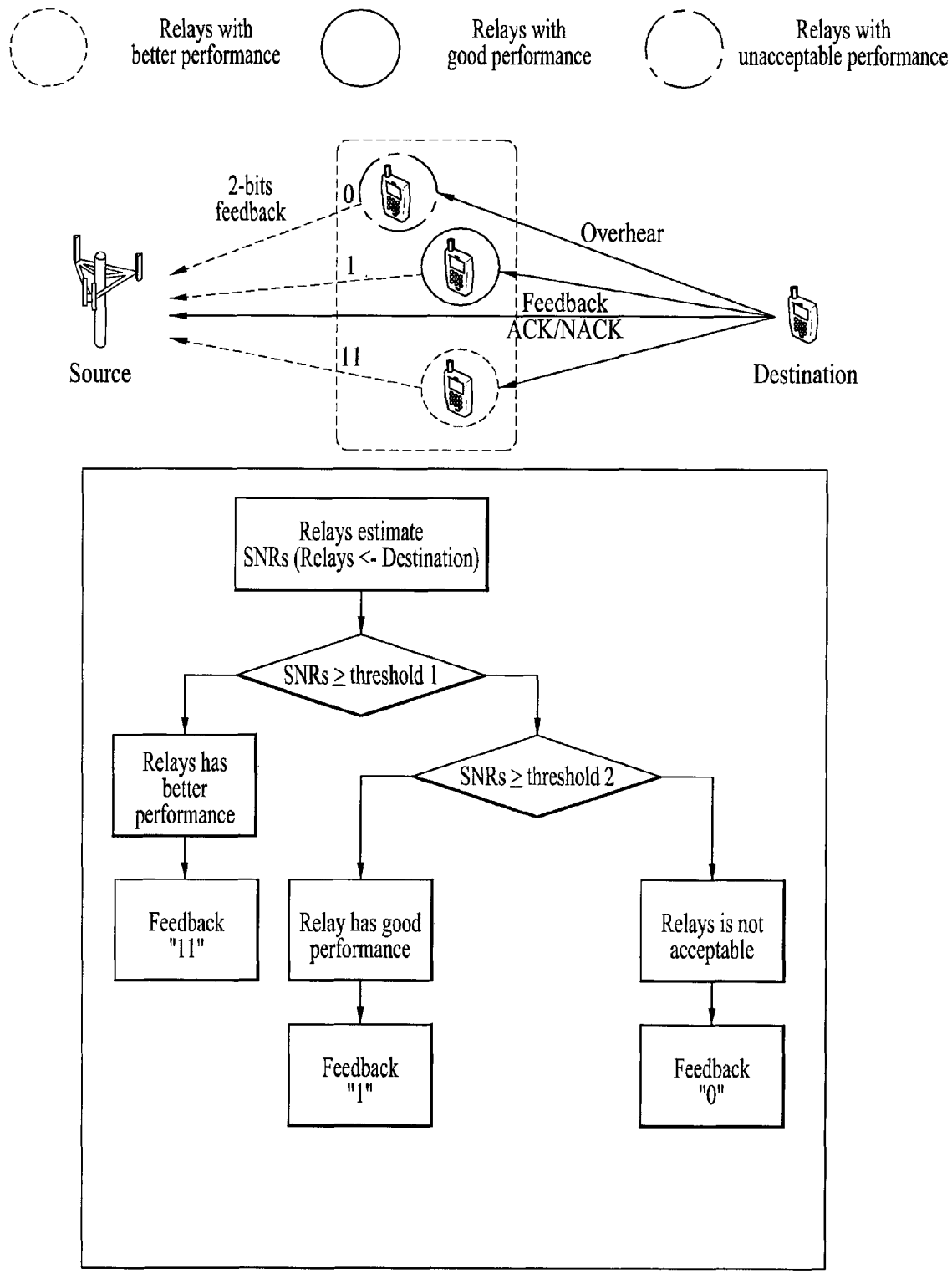
FIG. 19 and FIG. 20 are diagrams illustrating an example of transmitting data using a relay node selected in accordance with the present invention.
Figure 20:
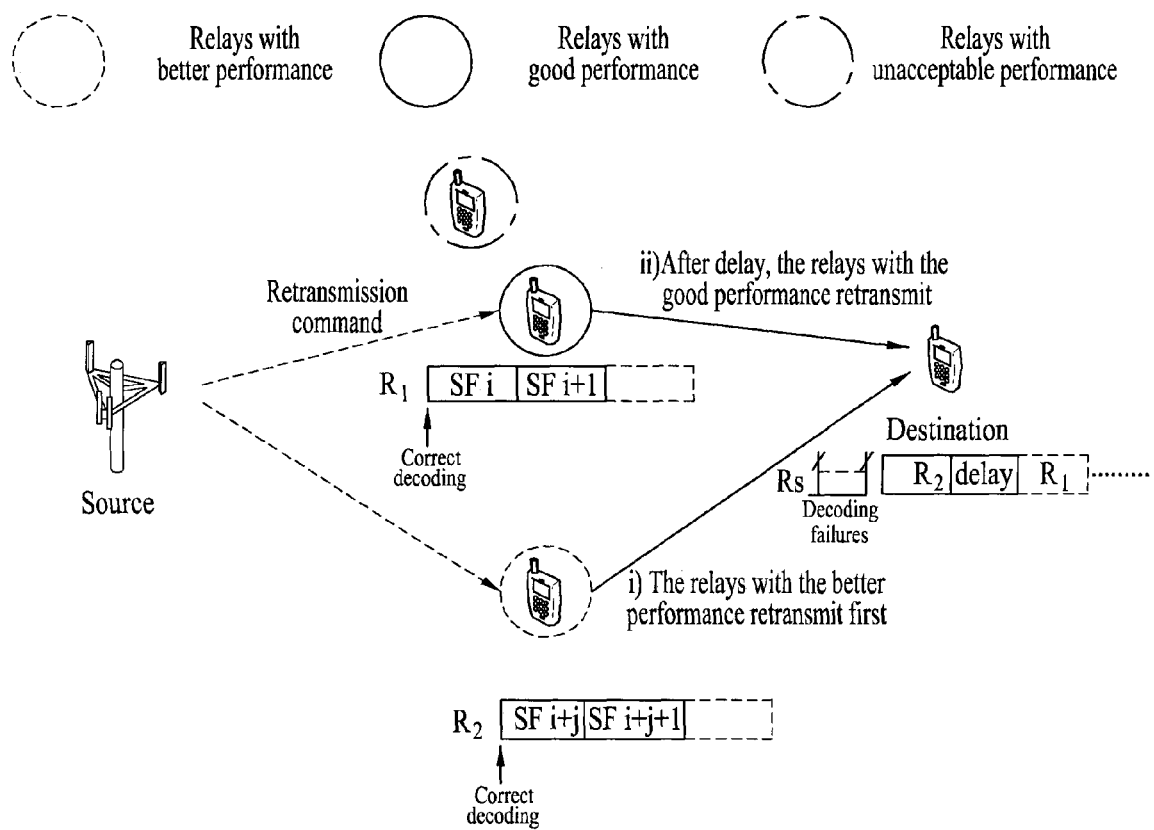

FIG. 19 and FIG. 20 are diagrams illustrating a configuration of the present invention based on ACK/NACK signal.

First of all, referring to FIG. 19, the plurality of user equipment relay nodes R may receive a feedback ACK/NACK signal from the destination node D. At least a part of the plurality of user equipment relay nodes R, which has successfully received the feedback ACK/NACK signal from the destination node, transmits the feedback ACK/NACK signal to the source node S.

Moreover, the plurality of user equipment relay nodes R may transmit a feedback ACK/NACK signal for the signal received from the source node S, to the source node S.

First of all, the source node S may select a user equipment relay node R, which will perform a relay operation, by using the feedback ACK/NACK signal received from the destination node D.

Also, by using the feedback ACK/NACK signal transmitted from each user equipment relay node R, a priority may additionally be given to the signals received from the source node S by the user equipment relay nodes R selected or not using the feedback ACK/NACK signal received from the destination node D.

Referring to FIG. 20, the plurality of user equipment relay nodes R may be divided into a first group, which performs the first relay operation by using the feedback ACK/NACK signal received from the destination node D, a second group, although not belong to the first group, designated to perform a relay operation for the signal received from the source node S subsequently to the first group by using the feedback ACK/NACK signal transmitted from each user equipment relay node R, and a third group which does not perform the relay operation.

Accordingly, the user equipment relay node R which belongs to the first group performs the relay operation first, and the user equipment relay node R which belongs to the second group supports the relay operation if the user equipment relay node R belonging to the first group does not support the relay operation.

In this case, since only a few properly selected relay nodes R, not all the user equipment relay nodes belonging to the system, join in the relay operation, performance degradation of the entire system may be prevented from occurring.

Figure 21:
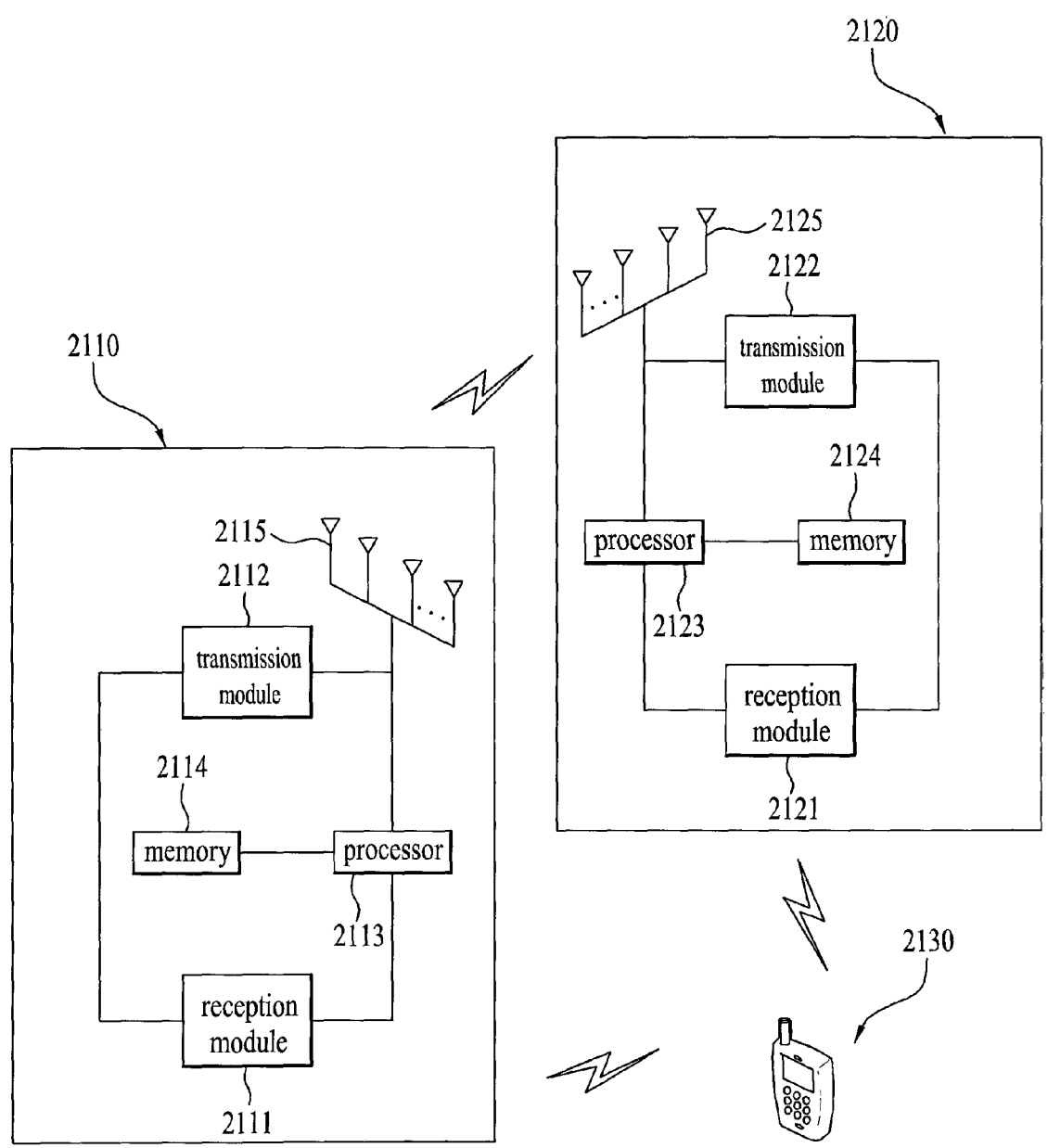
FIG. 21 is a diagram illustrating a wireless communication system that includes a base station, a relay station and a user equipment according to the present invention.

FIG. 21 is a diagram illustrating a wireless communication system that includes a base station, relay station and a user equipment according to the present invention.

Referring to FIG. 21, the base station 2110 according to the present invention may include a reception module 2111, a transmission module 2112, a processor 2113, a memory 2114, and a plurality of antennas 2115. The plurality of antennas 2115 may mean the base station that supports MIMO transmission and reception. The reception module 2111 may receive various signals, data and information on an uplink from one or more of the user equipment and the relay station. The transmission module 2112 may transmit various signals, data and information on a downlink to one or more of the user equipment and the relay station). The processor 2121 may control the overall operation of the base station 2110.

In addition, the processor 2113 of the base station 2110 performs an operation-processing function for information received by the base station 2110 and information to be externally transmitted by the base station 2110, and the memory 2114 may store the operation-processed information for a predetermined time, and may be replaced with an element such as a buffer (not shown).

Referring to FIG. 21, the relay station 2120 according to the present invention may include a reception module 2121, a transmission module 2122, a processor 2123, a memory 2124, and a plurality of antennas 2125. The plurality of antennas 2125 may mean the relay station that supports MIMO transmission and reception. The reception module 2121 may include a first reception module and a second reception module. The first reception module may receive various signals, data and information on a downlink from the base station, and the second reception module may receive various signals, data and information on an uplink from the user equipment. The transmission module 2122 may include a first transmission module and a second transmission module. The first transmission module may transmit various signals, data and information on the uplink to the base station, and the second transmission module may transmit various signals, data and information on the downlink to the user equipment. The processor 2123 may control the overall operation of the relay station 2120.

In addition, the processor 2123 of the relay station 2120 performs an operation-processing function for information received by the relay station 2120 and information to be externally transmitted by the relay station 2120, and the memory 2124 may store the operation-processed information for a predetermined time, and may be replaced with an element such as a buffer (not shown).

The details of the base station and the relay station described as above may be configured in such a manner that the description suggested in the aforementioned various methods of the present invention may be applied to the base station and the relay station independently or two ore more embodiments may be applied to the base station and the relay station simultaneously. The repeated details of the base station and the relay station may be omitted for clarification of description.

Also, the base station 2110 in the exemplary description of FIG. 21 may correspond to the source node S in the aforementioned embodiments of the present invention, the relay station 2120 may correspond to the relay node R, and the user equipment 2130 may correspond to the destination node D.

Also, the description of the base station 2110 in FIG. 21 may be applied to the relay node that controls a cell by itself. Also, the description of the base station 2120 in FIG. 21 may be applied to the user equipment (that is, user equipment-relay node) that assists the other user equipment 2130 in the cooperative communication environment.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention may be applied to various mobile communication systems.

What is claimed is:

1. A method for transmitting, by a relay node (RN), a re-encoded data to a user equipment (UE), the method comprising:
    receiving information on a codes and channels condition, that is to be used for forthcoming re-encoding and forthcoming transmitting, from a base station (BS);
    receiving, from the BS, and decoding an encoded data;
    re-encoding the decoded data in accordance with the codes and channels condition; and
    when the decoding is successfully performed in an M-th subframe, transmitting the re-encoded data from an M+1-th subframe to the UE in accordance with the codes and channels condition,
    wherein the codes and channels condition indicates that:
        the re-encoding and the transmitting are performed by using a plurality of sequential codes and channels which are to be used from the M+1-th subframe by the BS,
        the re-encoding and the transmitting are performed by using a code and channel which are used in the M-th subframe by the BS, or
        the re-encoding and the transmitting are performed by using a plurality of sequential codes and channels which are used from an initial subframe by the BS.

2. The method according to claim 1, further comprising:
    receiving a signal including an acknowledgement (ACK) or a negative ACK (NACK) information regarding the encoded data or the re-encoded data from the UE; and
    transmitting the signal to the BS.

3. The method according to claim 1, further comprising:
    receiving a signal including an acknowledgement (ACK) or a negative ACK (NACK) information regarding the encoded data or the re-encoded data from the UE; and
    determining a link status between the RN and the UE by using the signal.

4. The method according to claim 3, further comprising:
    transmitting the link status between the RN and the UE to the BS.

5. A relay node (RN) transmitting a re-encoded data to a user equipment (UE), the RN comprising:
    a radio frequency (RF) unit; and
    a processor configured to control the RF unit,
    wherein the processor is configured to:
        receive information on a codes and channels condition, that is to be used for forthcoming re-encoding and forthcoming transmitting, from a base station (BS),
        receive, from the BS, and decode an encoded data,
        re-encode the decoded data in accordance with the codes and channels condition, and
        when the decoding is successfully performed in an M-th subframe, transmit the re-encoded data from an M+1-th subframe to the UE in accordance with the codes and channels condition, and
    wherein the codes and channels condition indicates that:
        the re-encoding and the transmitting are performed by using a plurality of sequential codes and channels which are to be used from the M+1-th subframe by the BS,
        the re-encoding and the transmitting are performed by using a code and channel which are used in the M-th subframe by the BS, or
        the re-encoding and the transmitting are performed by using a plurality of sequential codes and channels which are used from an initial subframe by the BS.

6. The RN according to claim 5, wherein the processor is further configured to:
    receive a signal including an acknowledgement (ACK) or a negative ACK (NACK) information regarding the encoded data or the re-encoded data from the UE, and
    transmit the signal to the BS.

7. The RN according to claim 5, wherein the processor is further configured to:
    receive a signal including an acknowledgement (ACK) or a negative ACK (NACK) information regarding the encoded data or the re-encoded data from the UE, and
    determine a link status between the RN and the UE by using the signal.

* * * * *